(12) United States Patent
Takahashi et al.

(10) Patent No.: US 10,830,308 B2
(45) Date of Patent: Nov. 10, 2020

(54) TORSIONAL VIBRATION DAMPING DEVICE

(71) Applicant: TOYOTA JIDOSHA KABUSHIKI KAISHA, Toyota-shi, Aichi-ken (JP)

(72) Inventors: Yuya Takahashi, Susono (JP); Hiroyuki Amano, Susono (JP); Hideyuki Nishida, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 15/914,399

(22) Filed: Mar. 7, 2018

(65) Prior Publication Data

US 2018/0259034 A1 Sep. 13, 2018

(30) Foreign Application Priority Data

Mar. 8, 2017 (JP) .................................. 2017-044259
Jul. 5, 2017 (JP) .................................. 2017-132217

(51) Int. Cl.
*F16F 15/14* (2006.01)
*F16F 15/123* (2006.01)
(Continued)

(52) U.S. Cl.
CPC ...... *F16F 15/1478* (2013.01); *F16F 15/1206* (2013.01); *F16F 15/12353* (2013.01);
(Continued)

(58) Field of Classification Search
CPC .................................................. F16F 15/1206
See application file for complete search history.

(56) References Cited

U.S. PATENT DOCUMENTS 6,231,472 B1 5/2001 Sudau et al.
2014/0274524 A1 9/2014 Murakami
(Continued)

FOREIGN PATENT DOCUMENTS

DE 102013018996 A1 5/2015
JP 2008-164013 A 7/2008
(Continued)

*Primary Examiner* — Mark A Manley
(74) *Attorney, Agent, or Firm* — Hunton Andrews Kurth LLP

(57) ABSTRACT

A torsional vibration damping device that prevents an increase in an inertial torque due to resonance without reducing a mass of an inertial mass member. A torque of an engine is delivered to a first rotary element of a planetary unit. The torsional vibration damping device damps pulsation of the torque of the engine to be delivered to the transmission by an inertial torque generated by a rotation of the third rotary element resulting from a relative rotation between the first rotary element and the second rotary element caused by the pulsation of the engine torque. The torsional vibration damping device comprises: a connection member rotated integrally with the first rotary element; an intermediate member rotated integrally with the second rotary element; an output member delivering torque to the transmission; a first elastic member connecting the connection member to the intermediate member; and a second elastic member connecting the intermediate member to the output member.

15 Claims, 18 Drawing Sheets

(51) Int. Cl.
  *F16F 15/12*   (2006.01)
  *F16H 45/02*   (2006.01)
  *F16F 15/139*  (2006.01)
  *F16F 15/134*  (2006.01)
  *F16F 15/30*   (2006.01)
  *F16H 48/10*   (2012.01)

(52) U.S. Cl.
  CPC ..... *F16H 45/02* (2013.01); *F16H 2045/0226* (2013.01); *F16H 2045/0268* (2013.01)

(56) References Cited

U.S. PATENT DOCUMENTS

| | | |
|---|---|---|
| 2017/0122403 A1 | 5/2017 | Kobayashi et al. |
| 2017/0261065 A1 | 9/2017 | Yoshikawa et al. |
| 2018/0187743 A1* | 7/2018 | Yoshikawa ............... F16D 3/12 |

FOREIGN PATENT DOCUMENTS

| | | |
|---|---|---|
| JP | 2009115112 A | 5/2009 |
| JP | 2012225482 A | 11/2012 |
| JP | 2014074439 A | 4/2014 |
| JP | 2014-177956 A | 9/2014 |
| JP | 2016151301 A | 8/2016 |
| JP | WO2016208764 * | 12/2016 |
| WO | 2016047660 A1 | 3/2016 |
| WO | 2016-104783 A1 | 6/2016 |

* cited by examiner

TORSIONAL VIBRATION DAMPING DEVICE

CROSS REFERENCE TO RELATED APPLICATION

The present disclosure claims the benefit of Japanese Patent Applications No. 2017-044259 filed on Mar. 8, 2017 and No. 2017-132217 filed on Jul. 5, 2017, with the Japanese Patent Office, the disclosure of which is incorporated herein by reference in its entirety.

BACKGROUND

Field of the Disclosure

Embodiments of the present disclosure relate to the art of a damping device that suppresses torsional vibrations caused by torque pulse.

Discussion of the Related Art

JP-A-2014-177956 describes an example of a device having a planetary gear unit for suppressing torsional vibrations. According to the teachings of JP-A-2014-177956, the planetary gear unit comprises a ring gear connected to an engine, and a carrier connected to a transmission. The ring gear and carrier are connected to each other through springs to be rotated relatively to each other. In order to increase a mass of the sun gear of the planetary gear unit, an additional inertial member is attached to the sun gear. An angular velocity caused by periodical change of engine torque (torque pulse) is applied to the ring gear. As a result, torque governed by the angular velocity and an inertia moment of the ring gear and the like is applied to the ring gear. Meanwhile, an inertial force, in a direction for maintaining the angular velocity, is applied to the carrier as well as a member attached thereto and the like. This results in repeated relative rotation, involving compression and expansion of the springs between the ring gear and the carrier, causing compulsory rotation of the sun gear. The rotation of the sun gear is similar to the rotation of the ring gear caused by the torque pulsation. More specifically, the sun gear rotates back and forth within a predetermined angle range, as in the case of the pulsation described above. The vibration of the sun gear, as wells as the additional inertial member integrated therewith, results in an inertial force (inertial torque) governed by the angular velocity and the inertia moment. The vibration phase of the engine torque and the ring gear is different from that of the sun gear and the additional inertial member integrated with the sun gear. Thus, the inertial torque due to the vibration of the sun gear and the additional inertial member integrated with the sun gear absorbs pulsation of the torque to be applied to the transmission.

JP-A-2008-164013 describes a damper device for a vehicle. In the device, a what is known as a spring damper and a planetary gear unit are arranged between a lockup clutch and a turbine hub in a torque converter. The spring damper includes a coil spring and provides buffer effect. The planetary gear unit is configured to absorb torque pulsation with the inertial torque. The planetary gear unit is a single-pinion planetary gear unit with an input side plate, in the lockup clutch or the spring damper, serving as a carrier and the ring gear connected to an output side member in the spring damper or the turbine hub. An inertial member is attached to a sun gear. Thus, the spring damper and the planetary gear unit are both connected to the turbine hub.

In the device described in JP-A-2014-177956, the transmission is directly connected to a vibration system including the planetary gear unit, the spring, and the like. Thus, the pulsation of the inertial torque of the sun gear and the additional inertial member might resonate with pulsation due to torsion of members in the transmission and the like. When the pulsation of the inertial torque overwhelms the pulsation of torque transmitted from the ring gear to the carrier through the spring, the inertial torque produced by the sun gear might become a vibration source (vibromotive force). The mass of the sun gear and the additional inertia member may be reduced to achieve a pulsation level of the inertial torque due to the resonation at an allowable level. However, the reduction of the mass of the sun gear and the additional inertial member, leads to reduction of the inertial torque, resulting in a lower damping performance of the damping device as a whole. Thus, this damping device for a vehicle has a room for improvement.

The same applies to the damper device described in JP-A-2008-164013. In the device, the spring damper and the planetary gear unit are both connected to the transmission through a turbine hub. Thus, the transmission and an input shaft leading to the transmission might resonate with the spring damper and the planetary gear unit. When the resonance point is within a normal operation range of the vehicle, the ride quality and silence of the vehicle might be compromised.

SUMMARY

The present disclosure has been conceived noting the above-described technical problems, and it is therefore an object of the present disclosure is to prevent a reduction in damping performance of a torsional vibration damping device due to resonance with an output side member such as a transmission.

According to one aspect of the present disclosure, there is provided a torsional vibration damping device that is disposed on a torque transmission route between an engine and a transmission. The torsional vibration damping device comprises a planetary unit that performs a differential action among a first rotary element to which torque of the engine is delivered, a second rotary element, and a third rotary element serving as a rotary inertial mass. The torsional vibration damping device is adapted to damp pulsation of the torque of the engine to be delivered to the transmission by an inertial torque generated by a rotation of the third rotary element resulting from a relative rotation between the first rotary element and the second rotary element caused by the pulsation of the torque of the engine. In order to achieve the above-explained object, according to one aspect of the present disclosure, the torsional vibration damping device is provided with: a connection member that is rotated integrally with the first rotary element; an intermediate member that is rotated integrally with the second rotary element; an output member that delivers the torque to the transmission; a first elastic member that connects the connection member to the intermediate member; and a second elastic member that connects the intermediate member to the output member. The planetary unit includes a planetary gear unit having a sun gear, a ring gear, arranged concentrically with the sun gear, and a carrier supporting a plurality of pinion gears meshing with the sun gear and the ring gear. In the planetary unit, the sun gear serves as the first rotary element, one of the ring gear and the carrier serves as the second rotary element, and another one of the ring gear and the carrier serves as the third rotary element.

According to another aspect of the present disclosure, there is provided a torsional vibration damping device that is disposed on a torque transmission route between an engine and a transmission. The torsional vibration damping device comprises a planetary unit that performs a differential action among a first rotary element to which torque of the engine is delivered, a second rotary element, and a third rotary element serving as a rotary inertial mass. The torsional vibration damping device is adapted to damp pulsation of the torque of the engine to be delivered to the transmission by an inertial torque generated by a rotation of the third rotary element resulting from a relative rotation between the first rotary element and the second rotary element caused by the pulsation of the torque of the engine. In order to achieve the above-explained object, according to another aspect of the present disclosure, the torsional vibration damping device is provided with: a connection member that is rotated integrally with the first rotary element; an intermediate member that is rotated integrally with the second rotary element; an output member that delivers the torque to the transmission; a first elastic member that connects the connection member to the intermediate member; and a second elastic member that connects the intermediate member to the output member. The planetary unit includes a planetary gear unit having a sun gear, a ring gear arranged concentrically with the sun gear, and a carrier supporting a plurality of pinion gears meshing with the sun gear and the ring gear. In the planetary unit, the ring gear serves as the first rotary element, one of the sun gear and the carrier serves as the second rotary element, and another one of the sun gear and the carrier serves as the third rotary element.

According to still another aspect of the present disclosure, there is provided a torsional vibration damping device that is disposed on a torque transmission route between an engine and a transmission. The torsional vibration damping device comprises a planetary unit that performs a differential action among a first rotary element to which torque of the engine is delivered, a second rotary element, and a third rotary element serving as a rotary inertial mass. The torsional vibration damping device is adapted to damp pulsation of the torque of the engine to be delivered to the transmission by an inertial torque generated by a rotation of the third rotary element resulting from a relative rotation between the first rotary element and the second rotary element caused by the pulsation of the torque of the engine. In order to achieve the above-explained object, according to another aspect of the present disclosure, the torsional vibration damping device is provided with: a connection member that is rotated integrally with the first rotary element; an intermediate member that is rotated integrally with the second rotary element; an output member that delivers the torque to the transmission; a first elastic member that connects the connection member to the intermediate member; a second elastic member that connects the intermediate member to the output member; and a fluid coupling comprising a housing connected to the engine, a drive member that is connected to the housing and that creates a spiral flow of fluid, a driven member that is driven by the spiral flow of the fluid, and a lockup clutch that is engaged to an inner face of the housing to connect the drive member to the driven member. In the torsional vibration damping device, the planetary unit is arranged in the fluid coupling, the first rotary element of the planetary unit is selectively connected to the engine through the lockup clutch, the transmission is connected to the driven member, the lockup clutch is arranged on an inner side of the planetary unit in a radial direction of the housing, and the lockup clutch and the planetary unit are arranged concentrically with each other.

In a non-limiting embodiment, the first elastic member and the second elastic member may be arranged along a circumferential direction of the planetary unit.

In a non-limiting embodiment, the planetary unit may include a planetary gear unit having a sun gear, a ring gear arranged concentrically with the sun gear, and a carrier supporting a plurality of pinion gears meshing with the sun gear and the ring gear. In the planetary gear unit, the carrier may serve as the first rotary element, one of the ring gear and the sun gear may serve as the second rotary element, and another one of the ring gear and the sun gear may serve as the third rotary element.

In a non-limiting embodiment, the torsional vibration damping device may further comprise a fluid coupling comprising a housing connected to the engine, a drive member that is connected to the housing and that creates a spiral flow of fluid, a driven member that is driven by the spiral flow of the fluid, and a lockup clutch hat is engaged to an inner face of the housing to connect the drive member to the driven member. In the torsional vibration damping device, the planetary unit may be arranged in the fluid coupling, the first rotary element may be connected selectively to the engine through the lockup clutch, and the transmission may be connected to the driven member.

In a non-limiting embodiment, the lockup clutch may be arranged on an inner side of the planetary unit in a radial direction of the housing, and the lockup clutch and the planetary unit may be arranged concentrically with each other.

In a non-limiting embodiment, the lockup clutch may includes a multi-plate clutch having a clutch disc and a clutch plate that is brought into frictional contact to the clutch disc.

In a non-limiting embodiment, the first elastic member may have lower torsional rigidity than the second elastic member.

According to the embodiment of the present disclosure, periodical change, that is, pulsation of the engine torque is applied to the first rotary element through the connection member. The connection member is connected to the intermediate member rotated integrally with the second rotary element through the first elastic member. A reaction of torque resulting from rotating the second rotary element and the intermediate member is applied to the second rotary element and the intermediate member. Consequently, the first elastic member is deformed elastically so that the first rotary element and the second rotary element are rotated relatively to each other. As a result, the third rotary element serving as the rotary inertial mass member is rotated compulsory by such differential action of the planetary unit thereby generating an inertial torque. The inertial torque of the third rotary element serves as a resistance against the torque pulsation, that is, the pulsation of the engine torque is absorbed by the inertial torque of the third rotary element so that the engine torque is smoothened. The engine torque thus smoothened is applied to the intermediate member that is rotated integrally with the second rotary element. The intermediate member is connected to the output member, which delivers toque to the transmission, through the second elastic member. The torque rotating the output member and the transmission is applied to the output member and the transmission as a reaction. Consequently, the second elastic member is deformed elastically, and the intermediate member and the output member are rotated relatively to each other. As a result, vibration systems of the torsional vibration damping device including the second elastic member and the transmission are practically separated from each other. That is, two inertial systems are established. According to the embodiment, therefore, the inertial masses of the torsional vibration damping device and the transmission will not affect with each other. For this reason, the resonance point of the torsional vibration damping device is lowered and the resonance point of the transmission is raised. In a high frequency range, the pulsation of the engine torque is small, and the pulsation of the inertial torque, which is governed by the pulsation of the engine torque, is also small. That is, even when resonation occurs, the increase in the inertial torque due to the resonation can be prevented or limited. In addition, a total inertial mass of the inertial mass member is substantially increased so that the resonance point of the torsional vibration damping device is lowered. For these reasons, both of the resonance point of the vibration damping device and the resonance point of the transmission fall outside of the normal operation range of the engine. Further, since the torsional vibration damping device and the transmission are practically separated from each other, the inertial mass of the transmission will not be increased even if the mass of the third rotary element is increased to enhance the damping performance. That is, the resonance points of the vibration damping device and the transmission will not be changed. According to the embodiment, therefore, the inertial torque can be prevented from being increased even in the event of resonance, without reducing the mass of the inertial mass member. In other words, the resonance point can be lowered, and vibrations in the high speed range can be suppressed.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

First Embodiment

Figure 1:
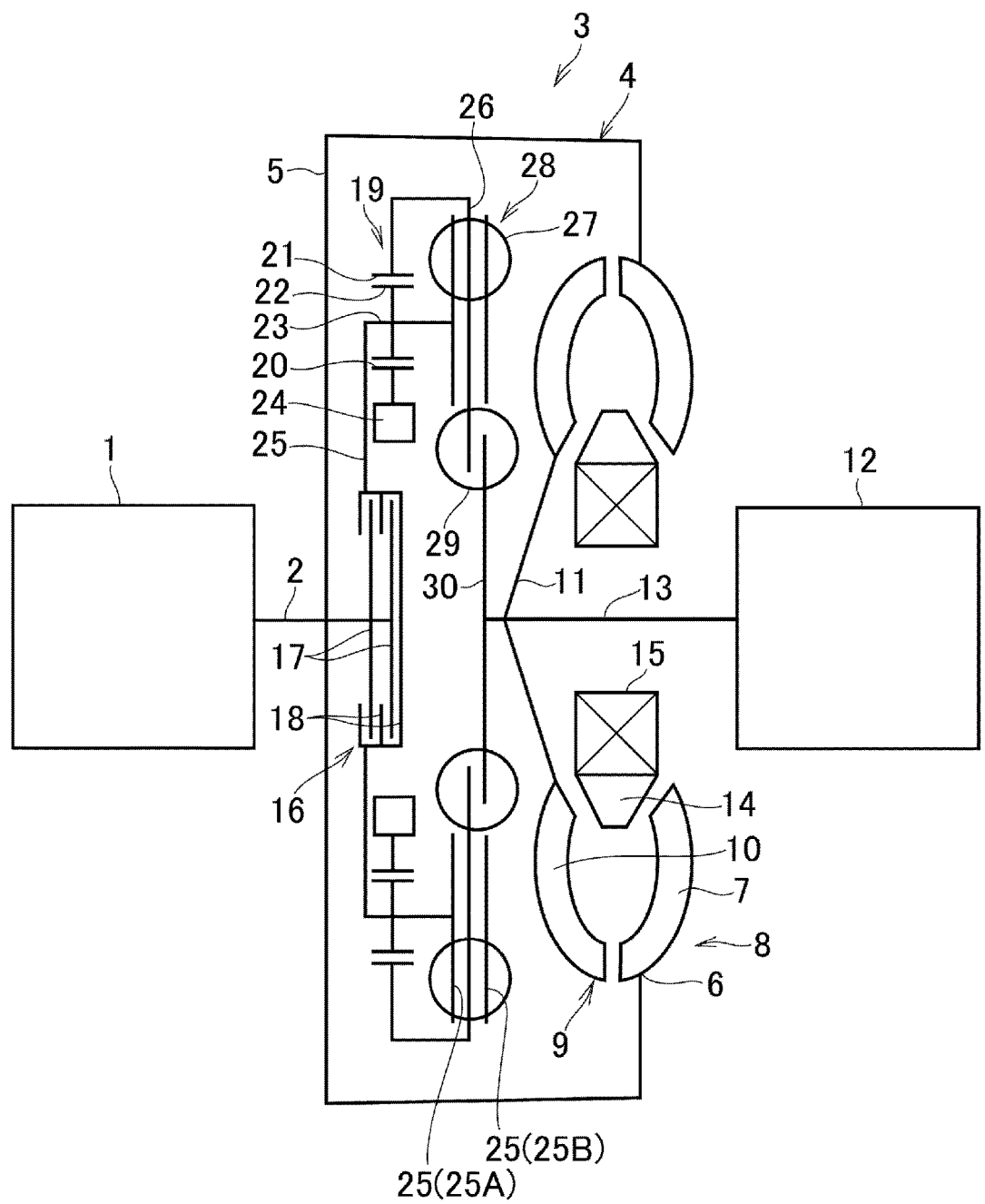
FIG. 1 is a schematic illustration showing a structure of a torque converter having a torsional vibration damping device according to a first embodiment of the present disclosure.

Preferred embodiments of the present disclosure will now be explained with reference to the accompanying drawings. Turning now to FIG. 1, there is shown the first embodiment of the torque converter having the torsional vibration damping device. A prime mover 1 comprises an output shaft 2 connected to a torque converter (T/C) 3. The prime mover 1 is an internal combustion engine that intermittently burns a fuel/air mixture to generate driving force. An output torque of the prime mover 1 pulsates inevitably. The prime mover 1 is hereinafter referred to as an engine 1. The torque converter 3 has a conventionally known configuration. A housing 4 of the torque converter 3 comprises a front cover 5 connected to the output shaft 2 of the engine 1, and a pump shell 6 joined to the front cover 5. An internal space of the housing 4 is maintained in a liquid-tight condition.

Fluid (e.g., oil) is held in the housing 4 to transmit torque. A plurality of pump blades 7 are attached to an inner face of the pump shell 6 to form a pump impeller 8. A turbine runner 9 that is rotated by a spiral flow of the fluid created by the pump impeller 8 is opposed to the pump impeller 8, to be substantially symmetrical with the pump impeller 8. Although not elaborated in the figure, the turbine runner 9 includes a turbine shell and a plurality of turbine blades 10 attached to an inner face of the turbine shell. The turbine runner 9 is connected to an input shaft 13 of a transmission 12 through a turbine hub 11. The torque converter 3 serves as a fluid coupling of the embodiments, the pump impeller 8 serves as a drive member of the embodiments, and the turbine runner 9 serves as a driven member of the embodiments. For example, a conventional transmission such as a geared transmission in which a speed ratio is changed stepwise, and a continuously variable transmission in which a speed ratio is varied continuously may be used as the transmission 12.

A stator 14 is interposed between the pump impeller 8 and the turbine runner 9 while being attached to a predetermined stationary member (not shown) through a one-way clutch 15. When a speed difference between the pump impeller 8 and the turbine runner 9 is small, the oil flowing out of the turbine runner 9 is delivered to the pump impeller 8 while changing a flowing direction. By contrast, when the speed difference between the pump impeller 8 and the turbine runner 9 is large, the oil flowing out of the turbine runner 9 is delivered to the pump impeller 8 without changing the flowing direction to rotate the pump impeller 8. To this end, when a speed difference between the pump impeller 8 and the turbine runner 9 is small, a rotation of the stator 14 is stopped by engaging the one-way clutch 15. By contrast, when a speed difference between the pump impeller 8 and the turbine runner 9 is large, the stator 14 is allowed to rotate by disengaging the one-way clutch 15.

A lockup clutch 16 is opposed to an inner face of the front cover 5. The lockup clutch 16 illustrated in FIG. 1 is a multiple-plate clutch comprising: a plurality of clutch discs 17 splined to a clutch hub (not shown) joined to the front cover 5; and a plurality of clutch plates 18 splined to a clutch drum (not shown) covering an outer circumference of the clutch hub. Specifically, the clutch discs 17 and the clutch plates 18 are arranged alternately between a lockup piston (not shown) and a snap ring (not shown) attached to the clutch drum. The clutch discs 17 and the clutch plates 18 are clamped to be frictionally contacted to one another between the lockup piston and the snap ring by advancing the lockup piston. As a result, the lockup clutch 16 is brought into engagement to transmit torque between the clutch discs 17 and the clutch plates 18.

A single-pinion planetary gear unit 19 as a planetary unit or of the embodiments is arranged in an outer circumferential side of the lockup clutch 16. In other words, the planetary unit is arranged concentrically with the lockup clutch 16 while being overlapped with the lockup clutch 16 at least partially in a radial direction of the torque converter 3. The planetary gear unit 19 is adapted to perform a differential action among a sun gear 20, a ring gear 21 arranged around the sun gear 20, and a carrier 23 that supports a plurality of pinion gears 22 interposed between the sun gear 20 and the ring gear 21 in a rotatable manner. According to the embodiments, the planetary unit includes a planetary roller unit.

In order to increase a mass of the sun gear 20, an inertial mass member 24 is formed integrally with the sun gear 20. Alternatively, the inertial mass member 24 may also be formed separately and attached to the sun gear 20. The carrier 23 is connected to the lockup clutch 16 (more specifically, to the clutch drum serving as the driven member) through a connection member 25 formed integrally with the carrier 23. The ring gear is connected to an intermediate member 26 as a part of an after-mentioned spring damper 28, and the connection member 25 is connected to the intermediate member 26 through an after-mentioned first elastic member 27 while being allowed to rotate relatively to the intermediate member 26. In the example illustrated in FIG. 1, a coil spring is used as the first elastic member 27 but other kind of member that is elastically deformed to allow the relative rotation between the connection member 25 and the intermediate member 26 may also be used as the first elastic member 27. Specifically, the first elastic member 27 is compressed and expanded by the relative rotation in a circumferential direction of the torque converter 3. Accordingly, in the first embodiment, the carrier 23 serves an input element, the sun gear 20 serves as a reaction element, and the ring gear 21 serves as an output element.

In the example illustrated in FIG. 1, the connection member 25 includes a pair of plates 25A and 25B as a part of the spring damper 28. Specifically, the plates 25A and 25B as annular plate members are arranged coaxially while being opposed to each other, and integrated with each other while maintaining a predetermined clearance therebetween.

The intermediate member 26 is a ring shaped plate member, and is interposed between the pair of plates 25A and 25B, and the intermediate member 26 and the pair of plates 25A and 25B are allowed to rotate relatively to each other. Thus, the intermediate member 26, the plates 25A and 25B, and the first elastic member 27 form the spring damper 28. A configuration of the spring damper 28 is described in detail later.

In the clearance between the plates 25A and 25B, an output member 30 is further interposed in a downstream of the intermediate member 26. A torque from the engine 1 is transmitted from the intermediate member 26 to the output member 30 integrated with the input shaft 13 of the transmission 12 through an after-mentioned second elastic member 29. That is, the intermediate member 26 is arranged on a torque transmission route between the planetary gear unit 19 and the output member 30. The second elastic member 29 is also a coil spring that is elastically compressed and expanded by a relative rotation between the intermediate member 26 and the output member 30.

The output member 30 transmits the torque delivered from the spring damper 28 to the turbine hub 11, and the output member 30 may be a part of the spring damper 28 or the turbine hub 11. As described later, one end of each of the second elastic members 29 is contacted to an inner protrusion of the intermediate member 26, and the other end of each of the second elastic members 29 is contacted to an outer protrusion of the output member 30. Specifically, the second elastic member 29 is compressed or expanded with a change in a distance between the receiving portions resulting from the relative rotation between the intermediate member 26 and the output member 30.

As described above, the spring damper 28 includes the first elastic member 27 as a buffering member between the intermediate member 26 and the connection member 25, and the second elastic member 29 as a buffering member between the intermediate member 26 and the output member 30. Torsional rigidities, that is, spring constants [N/mm] of the first elastic member 27 and the second elastic member 29 may be set to same value. Alternatively, the torsional rigidity of the first elastic member 27 may be set smaller than that of the second elastic member 29.

Figure 2:
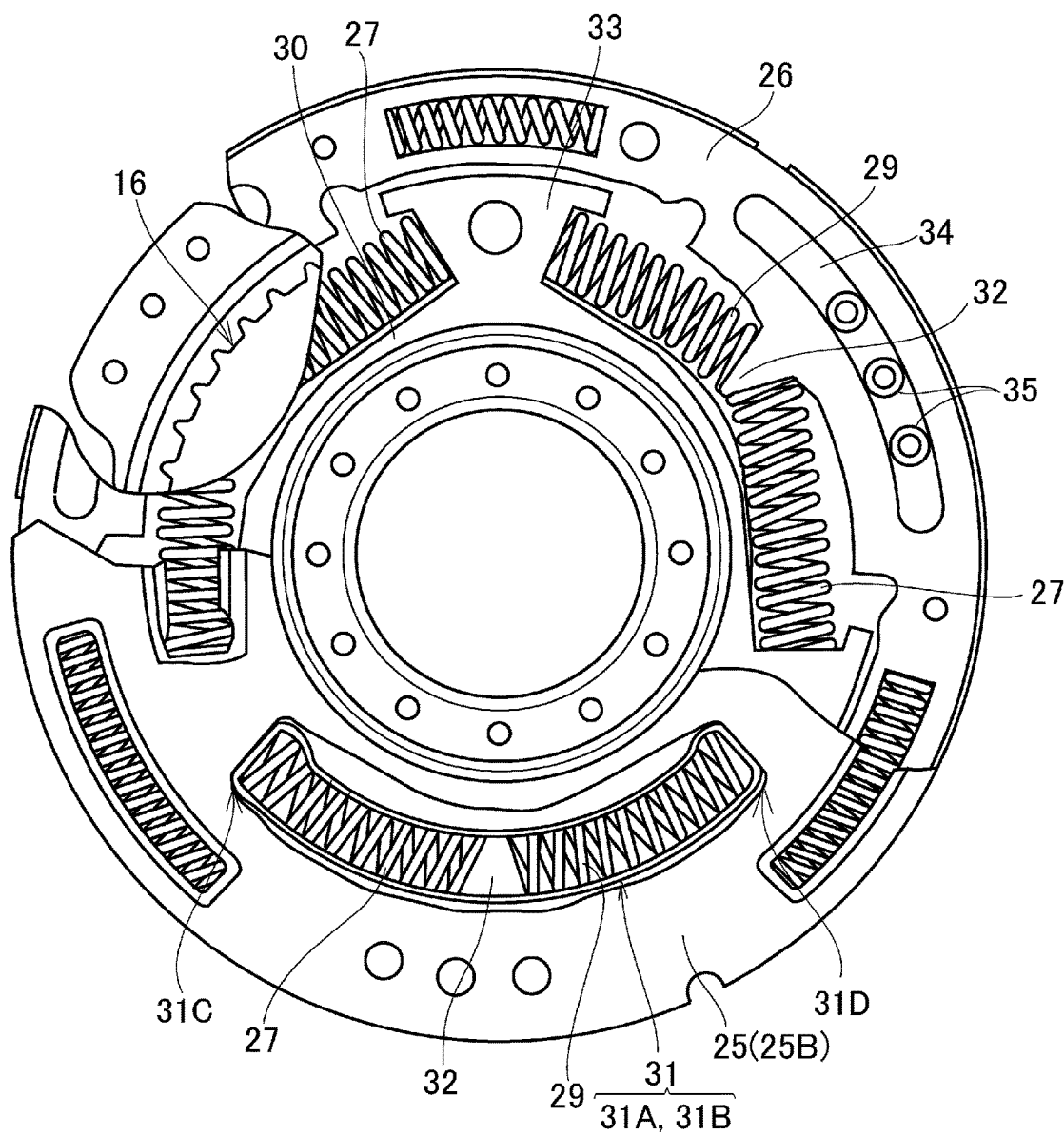
FIG. 2 is a partially transparent front view showing a structure of a spring damper used in a torsional vibration damping device according to a first embodiment.

The structure of the spring damper 28 is illustrated in FIG. 2 in more detail. FIG. 2 is a partially transparent front view showing the spring damper 28 from the transmission 12 side. According to the first embodiment, the first elastic member 27 and the second elastic member 29 are arranged in series in a circular manner (in a rotational direction of the engine 1). The intermediate member 26 is interposed between the annular plates 25A and 25B of the connection member 25 while being allowed to rotate relatively to the plates 25A and 25B at a predetermined angle. An inner diameter of the intermediate member 26 is larger than those of the plates 25A and 25B, and the output member 30 is interposed between the plates 25A and 25B in an inner circumferential side of the intermediate member 26. The intermediate member 26, the plates 25A and 25B, and the output member 30 are arranged coaxially with one another. An outer diameter of the output member 30 is smaller than the inner diameter of the intermediate member 26, and after-mentioned spring holders 31 are formed in the plates 25A and 25B at a level between an outer circumferential face of the output member 30 and an inner circumferential face of the intermediate member 26. In the plates 25A and 25B, three spring holders 31 are formed in a circular manner at equal intervals, and the first elastic member 27 and the second elastic member 29 are held in each spring holders 31 in series.

Specifically, three arcuate apertures 31A are formed in the plate 25A in a circular manner at equal intervals, and three arcuate apertures 31B are formed in the plate 25B in a circular manner at equal intervals. Detentions of each of the apertures 31A and the apertures 31B are substantially identical to each other, and the spring holders 31 are formed by overlapping the apertures 31A and 31B of the plates 25A and 25B. In addition, three inner protrusions 32 as pointed partition members are formed on the inner circumferential edge of the intermediate member 26 to protrude radially inwardly, and each of the inner protrusions 32 is individually interposed between the first elastic member 27 and the second elastic member 29 held in the spring holder 31. On the other hand, three inversed trapezoidal outer protrusions 33 are formed on the outer circumferential edge of the output member 30 to protrude radially outwardly so that the first elastic member 27 and the second elastic member 29 held in the spring holder 31 are situated between the adjacent outer protrusions 33. In the spring holder 31, the first elastic member 27 is situated between the inner protrusion 32 and the outer protrusion 33 of an upstream side in the torque transmitting direction (that is, in a rotational direction of the engine 1) while being compressed slightly, and the second elastic member 29 is situated between the inner protrusion 32 and the outer protrusion 33 of a downstream side in the torque transmitting direction while being compressed slightly.

In the example shown in FIG. 2, the spring damper 28 is rotated counterclockwise by the output torque of the engine 1. Specifically, in the spring damper 28, the plates 25A and 25B are rotated counterclockwise by the output torque of the engine 1. In the spring holder 31, the clearance between the plates 25A and 25B in an axial direction is smaller than an outer diameter of the first elastic member 27 so that the end portion of the first elastic member 27 of the upstream side is pushed by an upstream end 31C of the spring holder 31 (i.e., by end faces of the apertures 31A and 31B of the upstream side) when the plates 25A and 25B are rotated. In this situation, however, the other end portion of the first elastic member 27 of the downstream side is not brought into contact to a downstream end 31D of the spring holder 31 (i.e., to end faces of the apertures 31A and 31B of the downstream side). As a result, the first elastic member 27 is compressed between the upstream end 31C of the spring holder 31 and the inner protrusion 32 of the intermediate member 26 so that the torque is transmitted elastically from the upstream end 31C of the spring holder 31 to the inner protrusion 32 of the intermediate member 26 through the first elastic member 27.

A plurality of arcuate circumferential holes 34 are formed on an outer circumferential portion of the intermediate member 26 in a circular manner, and the plates 25A and 25B are connected to each other through fixing members 35 penetrating through the circumferential holes 34. For example, a rivet and a bolt may be used as the fixing member 35. An outer diameter of each of the fixing member 35 is smaller than an opening width of the circumferential hole 34 so that the intermediate member 26 and the pair of plates 25A and 25B connected through the fixing members 35 are allowed to rotate smoothly relative to each other.

Next, an action in the first embodiment will be explained hereinafter. First of all, an action of the torsional vibration damping device in which the first elastic member 27 and the second elastic member 29 have the same torsional rigidity will be explained hereinafter. When the lockup clutch 16 is engaged, the engine torque is applied to the carrier 23 and the connection member 25. In this situation, a load to rotate the output member 30 and the transmission 12 is applied to the ring gear 21 through the elastic members 27 and 29. Consequently, the first elastic members 27 are compressed by the engine torque and the load, and the carrier 23 formed integrally with the pair of plates 25A and 25B is rotated relatively to the ring gear 21 connected to the intermediate member 26 at a predetermined angle.

A compressive force (i.e., torsional force) applied to the first elastic member 27 changes due to the pulsation of the engine torque. That is, the relative rotation between the carrier 23 and the ring gear 21 repeatedly occurs due to periodical change (pulsation) in the engine torque. Consequently, the pinion gears 22 are rotated respectively within a predetermined angle range so that the sun gear 20 is compulsory rotated. In this situation, since the sun gear 20 is integrated with the inertial mass member 24, an inertial torque is generated in accordance with a total mass (i.e., inertial moment) of the sun gear 20 and the inertial mass member 24 and a rotational angular velocity. In the first embodiment, a rotational speed of the sun gear 20 is increased higher than a rotational speed of the ring gear 21 in accordance with a gear ratio. As a result, the rotational angular velocities of the sun gear 20 and the inertial mass member 24 are increased, thereby increasing the inertial torque. The pulsation of the engine torque is suppressed by the inertial torque thus increased. As a result, the engine torque applied to the carrier 23 is smoothened to be outputted from the intermediate member 26.

The torque to rotate the transmission 12 is applied as a reaction to the output member 30. Consequently, a load to compress the second elastic members 29 is created by the output torque of the intermediate member 26 and the torque applied to the output member 30 to rotate the transmission 12, and the second elastic members 29 are compressed by the load. As a result, the intermediate member 26 and the output member 30 are rotated relatively to each other at a predetermined angle, so that the pulsation of the torque transmitted to the transmission 12 through the spring damper 28 is absorbed by the compression of the second elastic members 29. The applied as a reaction to the output member 30 will be simply referred to as the "reaction torque" hereinafter.

Figure 3:
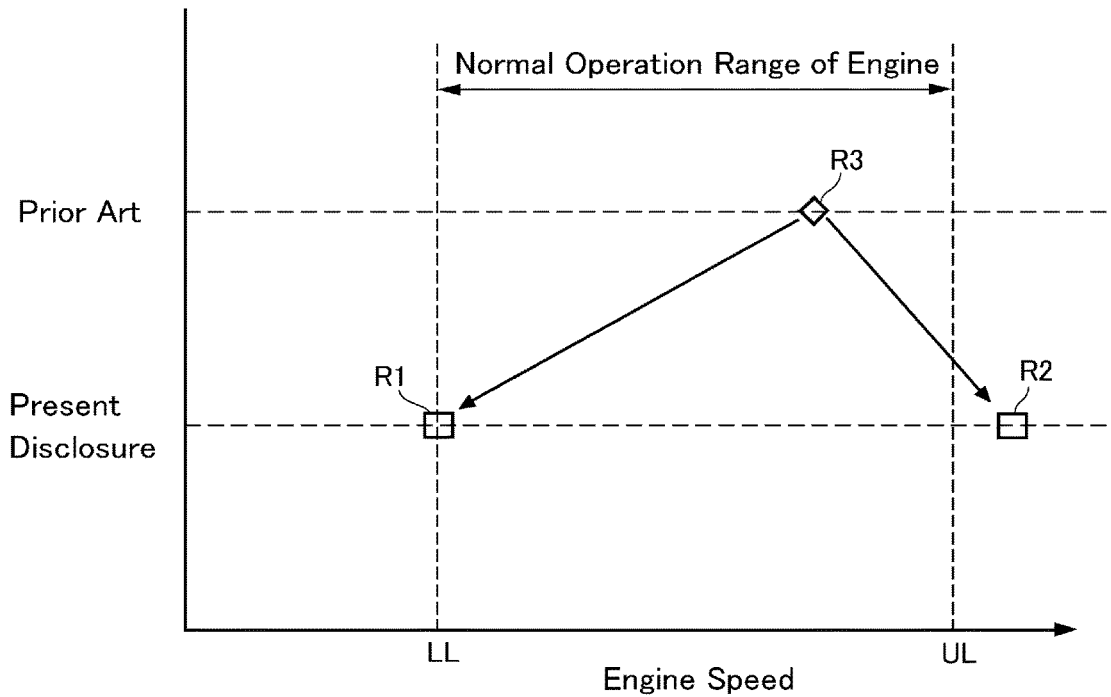
FIG. 3 is a graph showing resonance points of the torsional vibration damping device according to the first embodiment of the present disclosure.

FIG. 3 shows a resonance point of the torsional vibration damping device according to the first embodiment. In FIG. 3, "R1" represents a resonant frequency, that is, a resonance point of the torsional vibration damping device, "R2" represents a resonance point of the transmission 12, and "R3" represents a resonance point at which the torsional vibration damping device connected directly to the transmission 12 without the second elastic member 29 resonates. A normal operation range of the engine 1 shown in FIG. 3 is a range of rotation speeds of the engine 1 driven in a normal travelling state of a vehicle. For example, this range falls between a lower limit speed LL such as an idling speed of the engine 1 and a re-starting speed from fuel cut-off operation, and a predetermined upper limit speed UL in the normal travelling state.

The resonance point R1 of the torsional vibration damping device and the resonance point R2 of the transmission 12 will be described hereinafter. When the second elastic member 29 is elastically deformed by the pulsation of the engine torque, the torsional vibration damping device and the transmission 12 are substantially separated from each other in the vibration system, and hence an inertial mass of the transmission 12 is less likely to be applied to the torsional vibration damping device. Consequently, an inertial mass of the torsional vibration damping device is reduced. In other words, the total inertial mass of the sun gear 20 and the inertial mass member 24 serving as a rotary inertial mass member in the torsional vibration damping device is substantially increased. As a result, the resonance point R1 of the torsional vibration damping device is lowered to about a vibration frequency at the lower limit speed LL. In this situation, the inertial mass of the vibration system including the output member 30, the input shaft 13, and the transmission 12 is reduced. Consequently, the resonance point R2 of the transmission 12 is raised higher than the vibration frequency at the upper limit rotation speed UL. Thus, the inertial system (i.e., the vibration system) can be separated into two systems by the second elastic members 29. As a result, the resonance point R3 falling in the normal operation range of the engine 1 can be divided into the resonance point R1 of the torsional vibration damping device and the resonance point R2 of the transmission 12 respectively falling out of the normal operation range of the engine 1.

Figure 4:
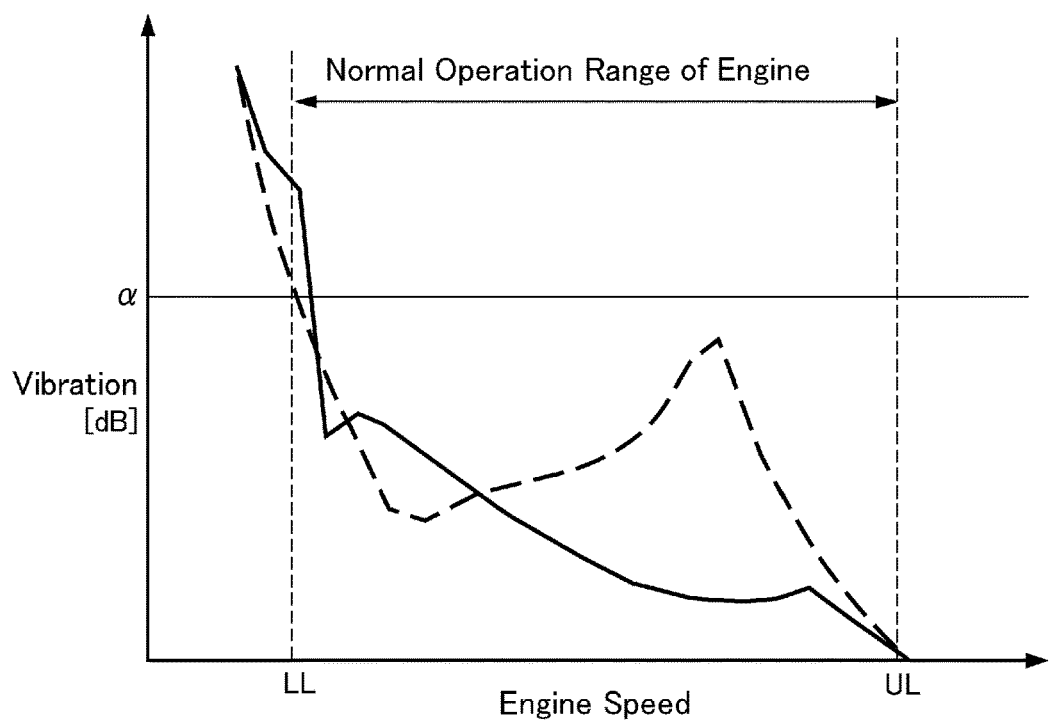
FIG. 4 is a graph showing vibration damping characteristics of the torsional vibration damping device according to the first embodiment of the present disclosure.

FIG. 4 is a graph schematically showing vibration damping characteristics of the torsional vibration damping device according to the first embodiment. In FIG. 4, the horizontal axis represents an engine speed, the vertical axis represents vibrations resulting from pulsation of the torque transmitted to the transmission 12 through the torsional vibration damping device, the solid curve represents the vibration damping characteristics of the torsional vibration damping device according to the first embodiment, the dashed curve represents vibration damping characteristics of a torsional vibration damping device according to a comparative example connected directly to the transmission 12 without the second elastic member 29, and the horizontal line a is a threshold of an allowable pulsation of torque. The threshold α may be set in advance based on the size class and model of the vehicle. As described above, both of the resonance points R1 and R2 fall outside of the normal operation range of the engine 1. According to the first embodiment, therefore, the pulsation of the engine torque can be suppressed lower than the threshold value a entirely in the normal operation range of the engine 1 as indicated by the solid curve. In addition, since the resonance point R2 of the transmission 12 in the vibration system of the transmission 12 falls within a higher speed range than the upper limit rotation speed UL, vibrations resulting from the torque pulse can be suppressed effectively especially in the high speed range of the engine 1. For this reason, an increase in the inertial torque due to resonance between the inertial torque and the pulsation of the engine torque in the high rotation speed range can be suppressed effectively. As a result of thus reducing the vibrations caused by the pulsation of the engine torque, damages on the torsional vibration damping device and the transmission 12 can be reduced.

Figure 5:
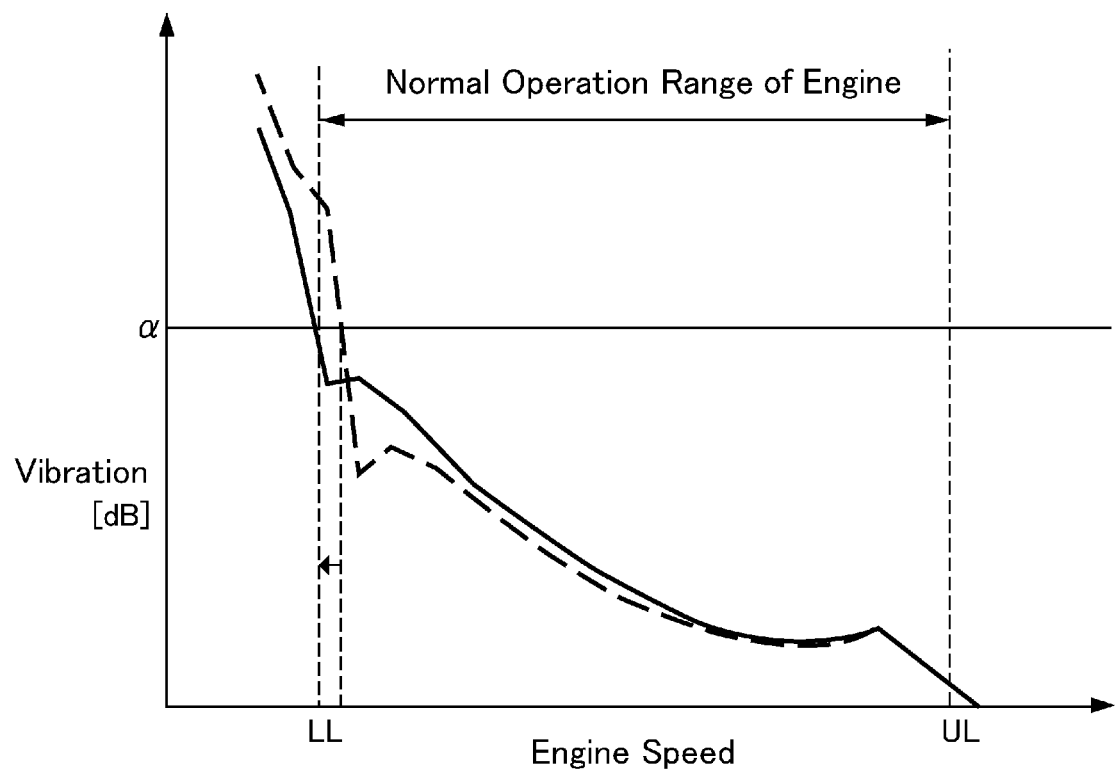
FIG. 5 is a graph showing vibration damping characteristics of the torsional vibration damping device according to the first embodiment of the present disclosure in a case where a mass of an inertial mass member is increased.

In addition, the vibration damping performance of the torsional vibration damping device in a low speed range can be enhanced by increasing a mass of the inertial mass member 24. The vibration damping characteristic of the torsional vibration damping device in which the mass of the inertial mass member 24 is increased is shown in FIG. 5. In FIG. 5, the solid curve represents the vibration damping characteristic of the torsional vibration damping device in which the mass of the inertial mass member 24 is increased, and the dashed curve represents the vibration damping characteristic of the torsional vibration damping device in which the mass of the inertial mass member 24 is not increased. As can be seen from FIG. 5, the resonance point R1 can be lowered by increasing the mass of the inertial mass member 24, in comparison with that of the case in which the mass of the inertial mass member 24 is not increased. In this case, therefore, the pulsation of the engine torque can be suppressed in the lower speed range. That is, the speed range in which the lockup clutch 16 can be kept engaged can be expanded toward the lower speed side. For this reason, the lockup clutch 16 is allowed to be engaged more frequently to reduce a power loss in torque converter 3 thereby saving the fuel. Further, since the vibration systems of the torsional vibration damping device and the transmission 12 are practically separated from each other by the second elastic members 29, the transmission 12 can be prevented from being subjected to vibromotive force (vibrating force) resulting from oscillation of the inertial mass member 24, and the resonance point R2 of the transmission 12 will not be changed. For these reasons, the vibration damping performance in the low speed range can be enhanced, and the pulsation of the engine torque in the high speed range can be suppressed. In the first embodiment, the carrier 23 serves as a first rotary element, the ring gear 21 serves as a second rotary element, and the sun gear 20 serves as a third rotary element.

Second Embodiment

Figure 6:
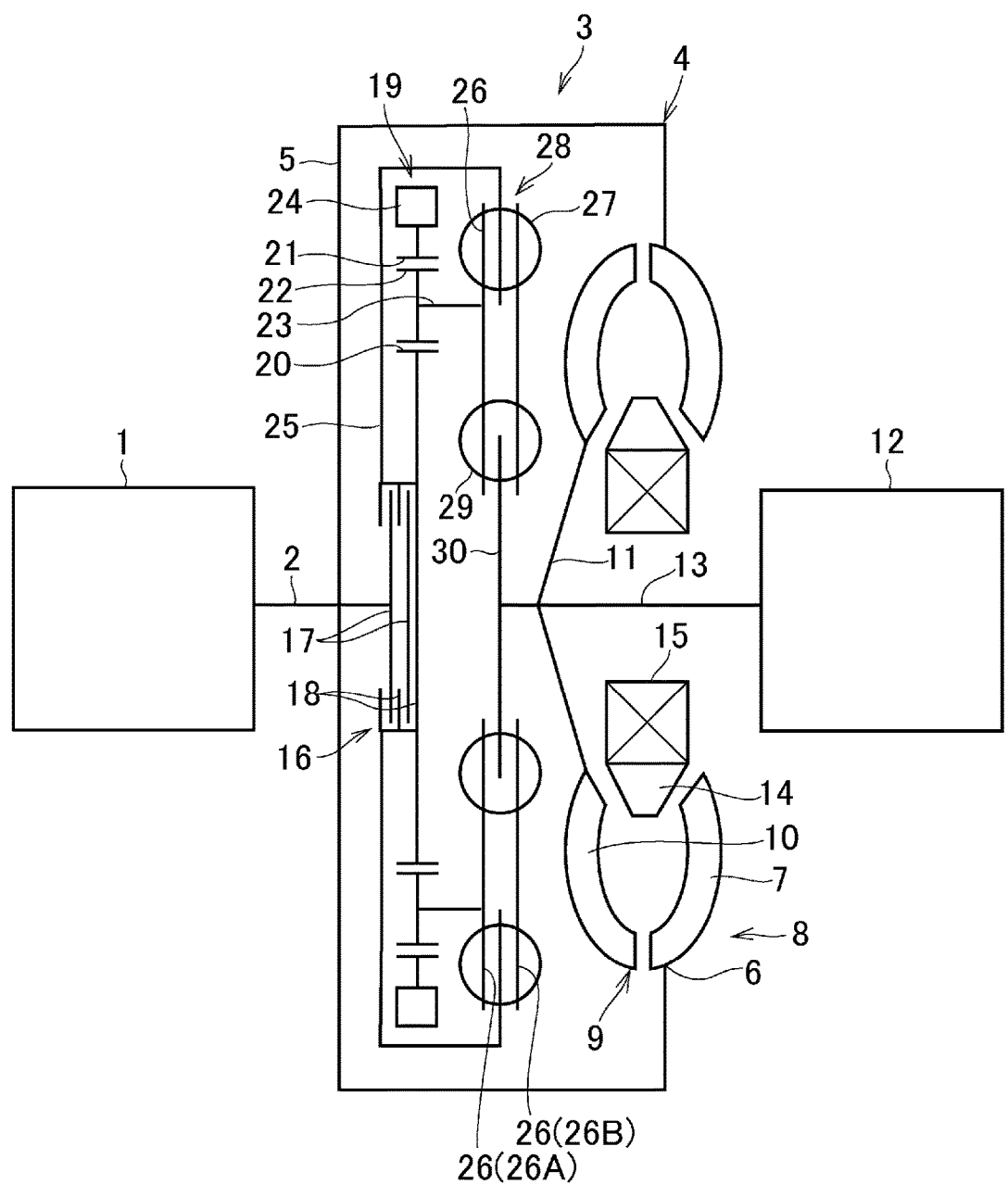
FIG. 6 is a schematic illustration showing a structure of a torque converter having a torsional vibration damping device according to a second embodiment of the present disclosure.

FIG. 6 shows the second embodiment of the present disclosure. In the second embodiment, the carrier 23 is connected to the lockup clutch 16 and the intermediate member 26 to serve as the output element, the sun gear 20 is connected to the connection member 25 through a clutch drum to serves as the input element, and the ring gear 21 is connected to the inertial mass member 24 to serve as the reaction element. In the second embodiment, accordingly, the sun gear 20 serves as the first rotary element, the carrier 23 serves as the second rotary element, and the ring gear 21 serves as the third rotary element.

According to the second embodiment, the intermediate member 26 includes a pair of plates 26A and 26B, and one connection member 25 is interposed between the plates 26A and 26B. The plates 26A and 26B are connected to the output member 30 through the second elastic members 29.

The remaining components of the configuration illustrated in FIG. 6 are similar to those in FIG. 1, and are denoted with the same reference numerals in FIG. 6. Such components will not be elaborated upon here.

An action of the torsional vibration damping device according to the second embodiment will be explained hereafter. When the lockup clutch 16 is engaged, engine torque is applied to the sun gear 20 and the connection member 25. Meanwhile, a load resulting from rotating the output member 30 and the transmission 12 is applied to the intermediate member 26 and the carrier 23. In this situation, the first elastic members 27 are compressed by the engine torque and the load. As a result, the sun gear 20 connected to the connection member 25 and the carrier 23 connected to the intermediate member 26 are rotated relatively to each other at a predetermined angle. Such relative rotation between the sun gear 20 and the carrier 23 are repeated by a periodical change (i.e., pulsation) of the engine torque. Consequently, the pinion gears 22 are respectively rotated at a predetermined angle so that the ring gear 21 is compulsory rotated. As a result, an inertial torque is generated in accordance with a total mass (i.e., inertial moment) of the ring gear 21 and the inertial mass member 24, and a rotational angular velocity. The pulsation of the engine torque is suppressed and smoothened by the inertial torque thus generated, and the engine torque is outputted from the intermediate member 26. The second elastic members 29 are compressed by the output torque of the intermediate member 26 and the reaction torque applied to the output member 30, and the intermediate member 26 and the output member 30 are rotated relatively to each other at a predetermined angle. As a result, the vibration systems of the torsional vibration damping device and the transmission 12 are practically separated from each other by the second elastic members 29, and the pulsation of the torque transmitted to the transmission 12 through the vibration damping device is absorbed by the elasticity of the elastic members 29.

According to the second embodiment, the ring gear 21 situated on the radially outer side of the torque converter 3 and the inertial mass member 24 integrated with the ring gear 21 serve as the rotary inertial mass member. The rotational speed of the ring gear 21 is increased higher than the rotational speed of the carrier 23 in accordance with the gear ratio. As a result, the rotational angular velocities of the ring gear 21 and the inertial mass member 24 are increased thereby increasing the inertial torque. In addition, the ring gear 21 and the inertial mass member 24 situated the radially outer side of the sun gear 20, serve as the rotary inertial mass member. According to the second embodiment, therefore, a centrifugal force of the rotary inertial mass member may be increased to further enhance the vibration damping performance of the vibration damping device. Further, the second elastic members 29 are interposed between the torsional vibration damping device and the transmission 12. According to the second embodiment, therefore, the inertial masses of the torsional vibration damping device and the transmission 12 will not affect with each other. For this reason, the resonance point R1 of the torsional vibration damping device is lowered and the resonance point R2 of the transmission 12 is raised as explained in the first embodiment. That is, both of the resonance point R1 and the resonance point R2 fall outside of the normal operation range of the engine 1.

Third Embodiment

Figure 7:
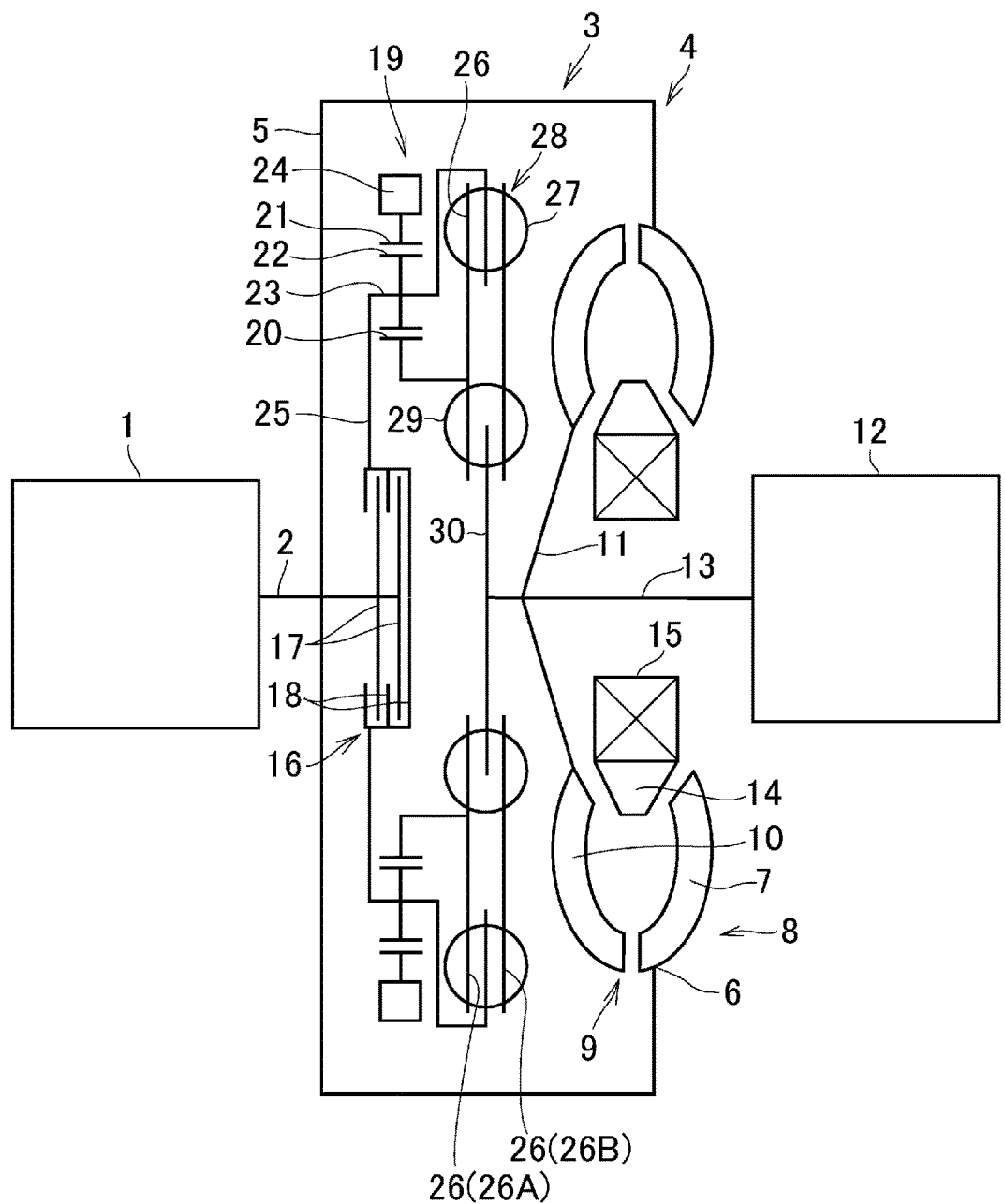
FIG. 7 is a schematic illustration showing a structure of a torque converter having a torsional vibration damping device according to a third embodiment of the present disclosure.

FIG. 7 shows a torque converter having a torsional vibration damping device according to the third embodiment as a modification of the second embodiment. According to the third embodiment, the carrier 23 is connected to the connection member 25 to serve as the input element instead of the sun gear 20, and the sun gear 20 is connected to the intermediate member to serve as the output element instead of the carrier 23. The remaining elements of the third embodiment are similar to those of the second embodiment shown in FIG. 6, and the common reference numerals are allotted to the elements in common with those of the second embodiment. In the third embodiment, the carrier 23 serves as the first rotary element, the sun gear 20 serves as the second rotary element, and the ring gear 21 serves as the third rotary element as the rotary inertial mass member.

Here will be explained an action of the third embodiment illustrated in FIG. 7. When the lockup clutch 16 is engaged, the engine torque is applied to the carrier 23 and the connection member 25. Meanwhile, a load resulting from rotating the output member 30 and the transmission 12 is applied to the intermediate member 26 and sun gear 20. In this situation, the first elastic members 27 are compressed by the engine torque and the load. As a result, the relative rotation between the carrier 23 connected to the connection member 25 and the sun gear 20 connected to the intermediate member 26 are rotated relatively to each other at a predetermined angle. Such relative rotation between the sun gear 20 and the carrier 23 are repeated by a periodical change (i.e., pulsation) of the engine torque. Consequently, the pinion gears 22 are respectively rotated at a predetermined angle so that and the ring gear 21 is compulsory rotated. As a result, an inertial torque is generated in accordance with the total mass (inertial moment) of the ring gear 21 and the inertial mass member 24, and a rotational angular velocity. The pulsation of the engine torque is suppressed and smoothened by the inertial torque thus generated, and the engine torque is outputted from the intermediate member 26. The second elastic members 29 are compressed by the output torque of the intermediate member 26 and the reaction torque applied to the output member 30, and the intermediate member 26 and the output member 30 are rotated relatively to each other at a predetermined angle. As a result, the vibration systems of the torsional vibration damping device and the transmission 12 are practically separated from each other by the second elastic members 29, and the pulsation of the torque transmitted to the transmission 12 through the vibration damping device is absorbed by the elasticity of the second elastic members 29.

In the third embodiment, the ring gear 21 and the inertial mass member 24 integrated with the ring gear 21 also serve as the rotary inertial mass member. According to the second embodiment, therefore, a centrifugal force of the rotary inertial mass member may be increased to further enhance the vibration damping performance of the vibration damping device. In addition, the torsional vibration damping device and the transmission 12 are also connected to each other through the second elastic members 29. According to the third embodiment, therefore, the inertial masses of the torsional vibration damping device and the transmission 12 will not affect with each other. For this reason, the resonance point R1 of the torsional vibration damping device is lowered and the resonance point R2 of the transmission 12 is raised as explained in the first embodiment. That is, both of the resonance point R1 and the resonance point R2 fall outside of the normal operation range of the engine 1.

Fourth Embodiment

Figure 8:
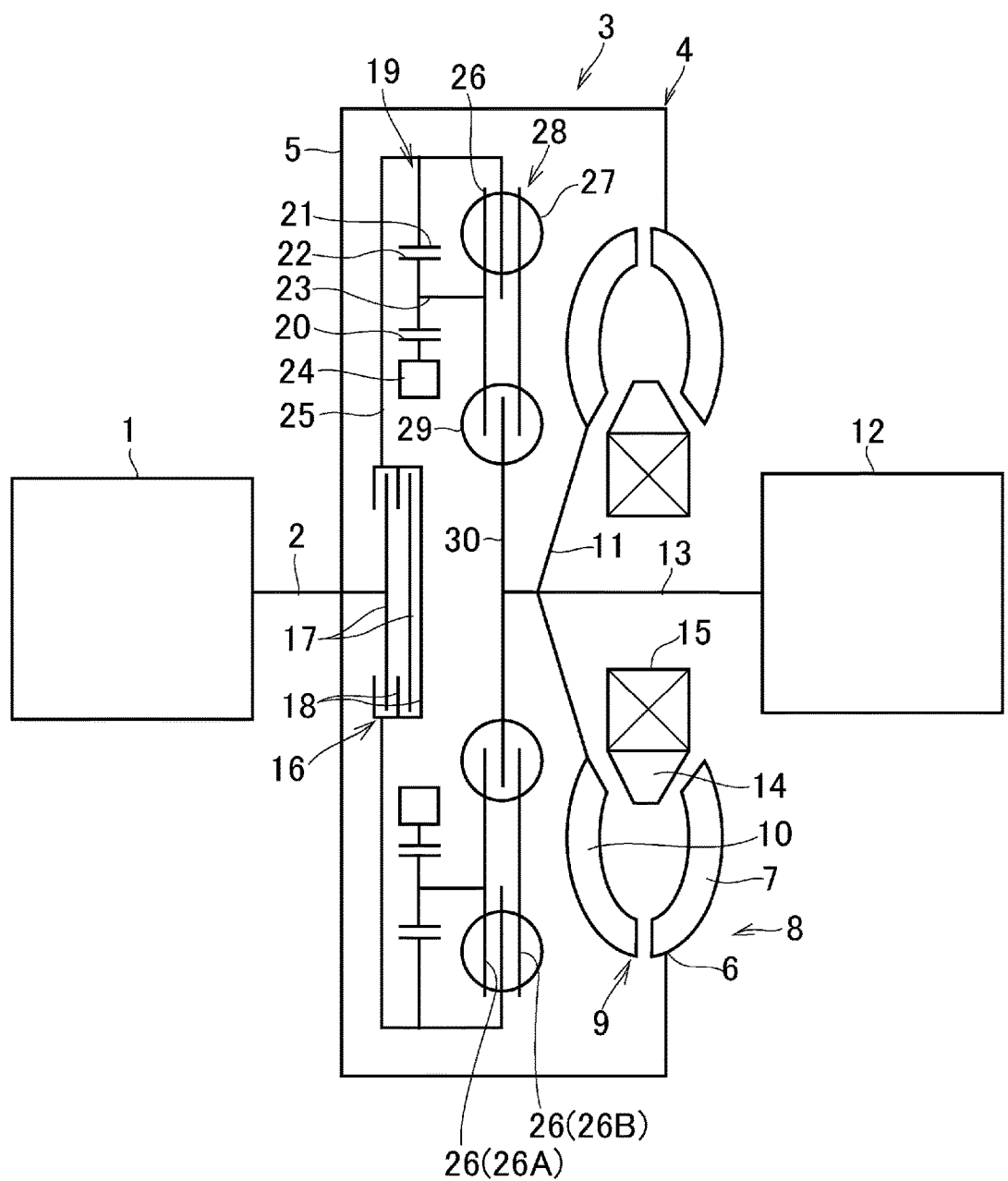
FIG. 8 is a schematic illustration showing a structure of a torque converter having a torsional vibration damping device according to a fourth embodiment of the present disclosure.

FIG. 8 shows a torque converter having a torsional vibration damping device according to the fourth embodiment as a modification of the second embodiment. According to the fourth embodiment, the ring gear 21 is connected to the connection member 25 to serve as the input element instead of the sun gear 20, and the sun gear 20 is connected to the inertial mass member 24 to serve as the reaction element instead of the ring gear 21. The remaining elements of the fourth embodiment are similar to those of the second embodiment shown in FIG. 6, and the common reference numerals are allotted to the elements in common with those of the second embodiment. In the fourth embodiment, the ring gear 21 serves as the first rotary element, the carrier 23 serves as the second rotary element, and the sun gear 20 serves as the third rotary element as the rotary inertial mass member.

Here will be explained an action of the fourth embodiment illustrated in FIG. 8. When the lockup clutch 16 is engaged, engine torque is applied to the ring gear 21 and the connection member 25. Meanwhile, a load resulting from rotating the output member 30 and the transmission 12 is applied to the intermediate member 26 and carrier 23. In this situation, the first elastic member 27 is compressed by the engine torque and the load. As a result, the relative rotation between the ring gear 21 connected to the connection member 25 and the carrier 23 connected to the intermediate member 26 are rotated relatively to each other at a predetermined angle. Consequently, the pinions gears 22 are respectively rotated at a predetermined angle, and the sun gear 20 is compulsory rotated. As a result, an inertial torque is generated in accordance with the total mass (inertial moment) of the sun gear 20 and the inertial mass member 24, and a rotational angular velocity. The pulsation of the engine torque is suppressed and smoothened by the inertial torque thus generated, and the engine torque is outputted from the intermediate member 26. The second elastic members 29 are compressed by the output torque of the intermediate member 26 and the reaction torque applied to the output member 30, and the intermediate member 26 and the output member 30 are rotated relatively to each other at a predetermined angle. As a result, the vibration systems of the torsional vibration damping device and the transmission 12 are practically separated from each other by the second elastic members 29, and the pulsation of the torque transmitted to the transmission 12 through the vibration damping device is absorbed by elasticity of the elastic members 29.

In the fourth embodiment, when the ring gear 21 is rotated by the engine torque, the rotational speed of the sun gear 20 is increased higher than the rotational speed of the carrier 23 in accordance with the gear ratio. As a result, the rotational angular velocities of the sun gear 20 and the inertial mass member 24 are increased so that the inertial torque to absorb the pulsation of torque is increased. That is, the vibration damping performance of the vibration damping device can be enhanced. In addition, the torsional vibration damping device and the transmission 12 are also connected to each other through the second elastic members 29. According to the fourth embodiment, therefore, the inertial masses of the torsional vibration damping device and the transmission 12 will not affect with each other. For this reason, the resonance point R1 of the torsional vibration damping device is lowered and the resonance point R2 of the transmission 12 is increased as explained in the first embodiment. That is, both of the resonance point R1 and the resonance point R2 fall outside of the normal operation range of the engine 1.

Fifth Embodiment

Figure 9:
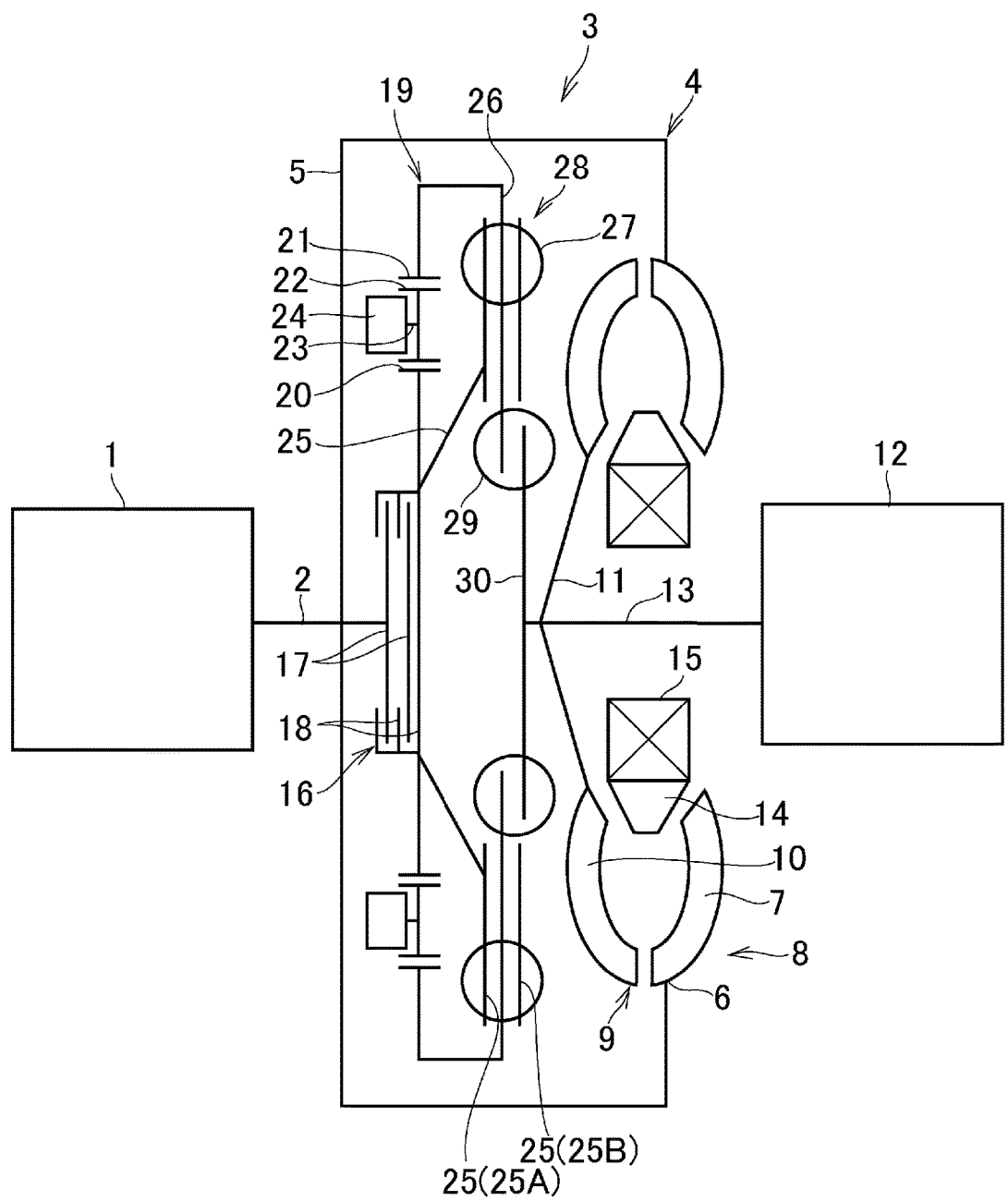
FIG. 9 is a schematic illustration showing a structure of a torque converter having a torsional vibration damping device according to a fifth embodiment of the present disclosure.

FIG. 9 shows a torque converter having a torsional vibration damping device according to the fifth embodiment as a modification of the first embodiment. According to the fifth embodiment, the sun gear 20 is connected to the connection member 25 to serve as the input element instead of the carrier 23, and the carrier 23 is connected to the inertial mass member 24 to serve as the reaction element instead of the sun gear 20. The remaining elements of the fifth embodiment are similar to those of the first embodiment shown in FIG. 1, and the common reference numerals are allotted to the elements in common with those of the second embodiment. In the fifth embodiment, the sun gear 20 serves as the first rotary element, the ring gear 21 serves as the second rotary element, and the carrier 23 serves as the third rotary element as the rotary inertial mass member.

An action of the torsional vibration damping device according to the fifth embodiment will be explained hereafter. When the lockup clutch 16 is engaged, engine torque is applied to the sun gear 20 and the connection member 25. Meanwhile, the load resulting from rotating the output member 30 and the transmission 12 is applied to the ring gear 21 and the intermediate member 26. In this situation, the first elastic members 27 are compressed by the engine torque and the load, and the sun gear 20 connected to the connection member 25 and the ring gear 21 connected to the intermediate member 26 are rotated relatively to each other at a predetermined angle. Consequently, the pinion gears 22 are respectively rotated at a predetermined angle so that the carrier 23 is compulsory rotated. As a result, an inertial torque is generated in accordance with a total mass (i.e., inertial moment) of the carrier 23 and the inertial mass member 24, and a rotational angular velocity. The pulsation of the engine torque is suppressed and smoothened by the inertial torque thus generated, and the engine torque is outputted from the intermediate member 26. The second elastic members 29 are compressed by the output torque of the intermediate member 26 and the reaction torque applied to the output member 30, and the intermediate member 26 and the output member 30 are rotated relatively to each other at a predetermined angle. As a result, the vibration systems of the torsional vibration damping device and the transmission 12 are practically separated from each other by the second elastic members 29, and the pulsation of the torque transmitted to the transmission 12 through the vibration damping device is absorbed by the elasticity of the elastic members 29.

According to the fifth embodiment, the carrier 23 and the inertial mass member 24 situated the radially outer side of the sun gear 20 serve as the rotary inertial mass member. According to the fifth embodiment, therefore, a centrifugal force of the rotary inertial mass member may be increased to enhance the vibration damping performance of the vibration damping device in comparison with that of the case in which the sun gear 20 is used as the rotary inertial mass member. In addition, the torsional vibration damping device and the transmission 12 are also connected to each other through the second elastic members 29. According to the fifth embodiment, therefore, the inertial masses of the torsional vibration damping device and the transmission 12 will not affect with each other. For this reason, the resonance point R1 of the torsional vibration damping device is lowered and the resonance point R2 of the transmission 12 is raised as explained in the first embodiment. That is, both of the resonance point R1 and the resonance point R2 fall outside of the normal operation range of the engine 1.

Sixth Embodiment

Figure 10:
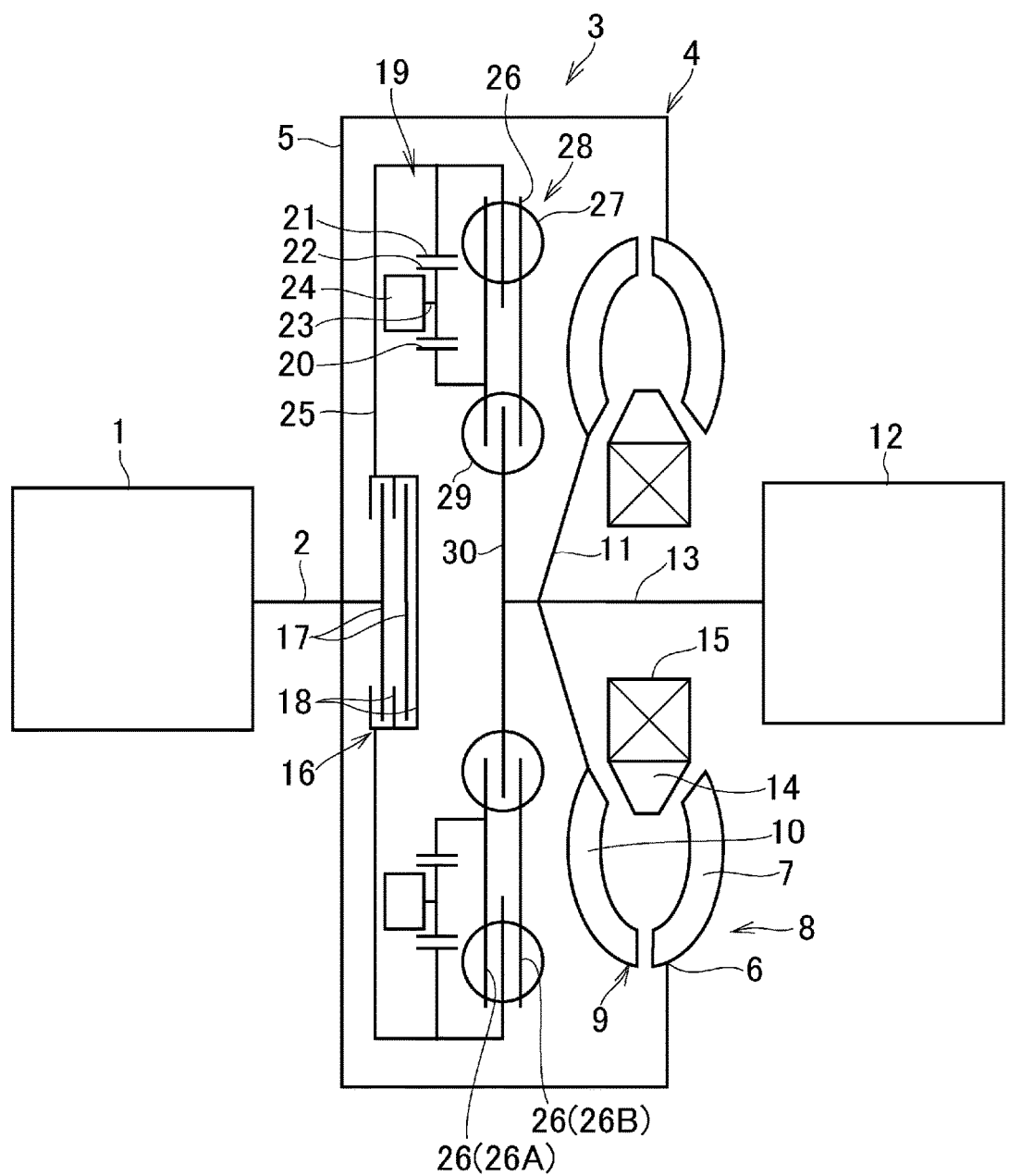
FIG. 10 is a schematic illustration showing a structure of a torque converter having a torsional vibration damping device according to a sixth embodiment of the present disclosure.

FIG. 10 shows a torque converter having a torsional vibration damping device according to the sixth embodiment as a modification of the fifth embodiment. According to the sixth embodiment, the ring gear 21 is connected to the connection member 25 to serve as the input element instead of the sun gear 20, and the sun gear 20 is connected to the intermediate member 26 to serve as the output element instead of the ring gear 21. The remaining elements of the sixth embodiment are similar to those of the fifth embodiment shown in FIG. 9, and the common reference numerals are allotted to the elements in common with those of the second embodiment. In the sixth embodiment, the ring gear 21 serves as the first rotary element, the sun gear 20 serves as the second rotary element, and the carrier 23 serves as the third rotary element as the rotary inertial mass member.

An action of the torsional vibration damping device according to the sixth embodiment will be explained hereafter. When the lockup clutch 16 is engaged, engine torque is applied to the ring gear 21 and the connection member 25. Meanwhile, the load resulting from rotating the output member 30 and the transmission 12 is applied to the sun gear 20 and the intermediate member 26. In this situation, the first elastic members 27 are compressed by the engine torque and the load, and the ring gear 21 connected to the connection member 25 and the sun gear 20 connected to the intermediate member 26 are rotated relatively to each other at a predetermined angle. Consequently, the pinion gears 22 are respectively rotated at a predetermined angle so that the carrier 23 is compulsory rotated. As a result, an inertial torque is generated in accordance with a total mass (i.e., inertial moment) of the carrier 23 and the inertial mass member 24, and a rotational angular velocity. The pulsation of the engine torque is suppressed and smoothened by the inertial torque thus generated, and the engine torque is outputted from the intermediate member 26. The second elastic members 29 are compressed by the output torque of the intermediate member 26 and the reaction torque applied to the output member 30, and the intermediate member 26 and the output member 30 are rotated relatively to each other at a predetermined angle. As a result, the vibration systems of the torsional vibration damping device and the transmission 12 are practically separated from each other by the second elastic members 29, and the pulsation of the torque transmitted to the transmission 12 through the vibration damping device is absorbed by the elasticity of the elastic members 29.

In the sixth embodiment, the carrier 23 and the inertial mass member 24 integrated with the carrier 23 serve as the rotary inertial mass member, as in the fourth embodiment. According to the sixth embodiment, therefore, a centrifugal force of the rotary inertial mass member may be increased to enhance the vibration damping performance of the vibration damping device in comparison with that of the case in which the sun gear 20 is used as the rotary inertial mass member. In addition, the torsional vibration damping device and the transmission 12 are also connected to each other through the second elastic members 29. According to the sixth embodiment, therefore, the inertial masses of the torsional vibration damping device and the transmission 12 will not affect with each other. For this reason, the resonance point R1 of the torsional vibration damping device is lowered and the resonance point R2 of the transmission 12 is raised as explained in the first embodiment. That is, both of the resonance point R1 and the resonance point R2 fall outside of the normal operation range of the engine 1.

Seventh Embodiment

Next, a torsional vibration damping device according to the seventh embodiment will be explained hereinafter. In the torsional vibration damping device according to the seventh embodiment, the torsional rigidities of the first elastic members 27 are reduced lower than those of the second elastic members 29 and the mass of the inertial mass member 24 is reduced lighter than those in the foregoing embodiments, while maintaining a total torsional rigidity $k_t$ of the first elastic members 27 and the second elastic members 29 to that in the foregoing embodiments. Fundamental structure of the torsional vibration damping device according to the seventh embodiment is similar to those of the foregoing embodiments.

According to the embodiments, the pulsation of the engine torque is damped by the inertial torque of the inertial mass member 24. Therefore, in order not to generate the vibration by the inertial torque, the inertial torque is preferably equal to or smaller than the engine torque transmitted through the vibration damping device whose pulsation is damped by the inertial torque. An engine speed w at which the engine torque transmitted through the vibration damping device and the inertial torque are equal to each other can be expressed as the following expression (1):

$$\omega = \sqrt{\frac{k1}{Ii \cdot B(B+1)}}$$

where "k1" is the torsional rigidity of the first elastic member 27, "Ii" is the inertial mass of the inertial mass member 24, and "B" is a ratio of the rotational speed of the rotary element serving as the rotary inertial mass member to the rotational speed of the rotary element connected to the intermediate member 26. The ratio B is a predetermined value determined based on the basic specification of the planetary gear unit 19 including the size, the number of teeth of each rotary element, and the gear ratio etc. For example, the gear ratio is a ratio of the number of teeth of the sun gear 20 to the number of teeth of the ring gear 21 (the number of teeth of the sun gear 20/the number of teeth of the ring gear 21). Here, "B" is referred to as speed increase gain B. Given that the speed increase gain B is greater than "1", the rotational speed of the rotary element serving as the rotary inertial mass member is increased higher than the rotational speed of the rotary element connected to the intermediate member 26.

As descried, in the foregoing embodiments, the pulsation of the engine torque transmitted through the vibration damping device is damped by the second elastic member 29. Each of the first elastic members 27 and each of the second elastic members 29 are individually connected to each other in series, and hence the total torsional rigidity kt in the torsional vibration damping device according to each embodiment can be expressed by the following expression (2):

$$1/k_t = 1/k_1 + 1/k_2;$$

where $k_2$ is the torsional rigidity of the second elastic member 29. In the seventh embodiment, the torsional rigidity k1 of the first elastic member 27, the torsional rigidity $k_2$ of the second elastic member 29, and the inertial mass member Ii of the inertial mass member 24 are set in such a manner as to satisfy the expressions (1) and (2). Specifically, the torsional rigidity $k_1$ of the first elastic member 27 and the mass Ii of the inertial mass member 24 are reduced, and the torsional rigidity $k_2$ of the second elastic member 29 is increased as much as the reduction in the torsional rigidity $k_1$ of the first elastic member 27. Thus, the total torsional rigidity kt of the first elastic members 27 and the second elastic members 29 is maintained.

Figure 11:
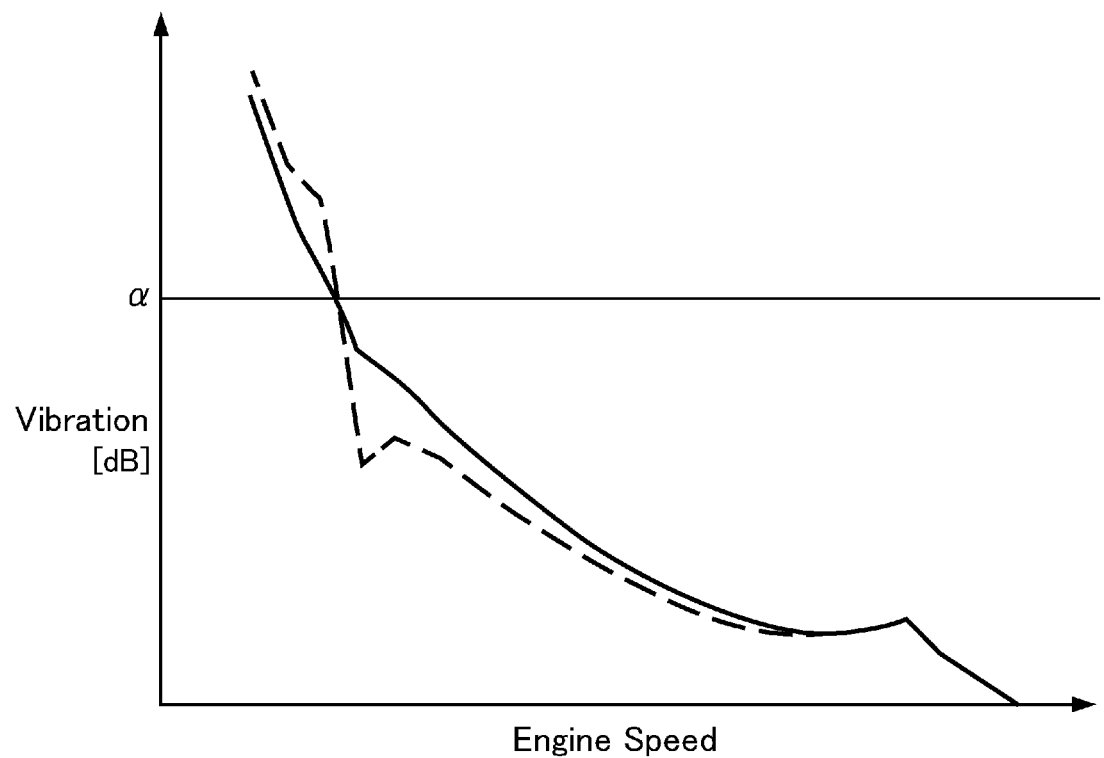
FIG. 11 is a graph showing vibration damping characteristics of a torsional vibration damping device according to a seventh embodiment of the present disclosure in a case where a first elastic member has lower rigidity than a second elastic member and a mass of an inertial mass member is reduced.

Vibration damping characteristics of the torsional vibration damping device according to the seventh embodiment is shown in FIG. 11. In FIG. 11, the solid curve represents the vibration characteristics of a vibration damping device in which the torsional rigidity $k_1$ of the first elastic member 27 is reduced to be one third of the torsional rigidity $k_2$ of the second elastic member 29, and the mass of the inertial mass member 24 is reduced to be smaller than that in a conventional torsional vibration damping device without having the second elastic member 29. The dotted curve represents the vibration characteristics of a device in which the torsional rigidity $k_1$ of the first elastic member 27 is set to be equal to the torsional rigidity $k_2$ of the second elastic member 29, and the mass of the inertial mass member 24 is set to be equal to that in the conventional torsional vibration damping device. In any of the devices, the total torsional rigidity $k_t$ is set to the same value. As indicated in FIG. 11, the vibration damped by the device represented by the solid curve is slightly larger than the vibration damped by the device represented by the dashed curve, within the speed range higher than the speed at which the vibration exceeds the threshold α. However, the vibration exceeds the threshold α at same speed in any of the cases. This means that a lockup region in which the lockup clutch 16 is engaged will not be narrowed toward the higher speed side. According to the seventh embodiment, therefore, can be downsized and lightened by thus reducing the mass of the inertial mass member 24 while maintaining the damping performance.

Eighth Embodiment

Figure 12:
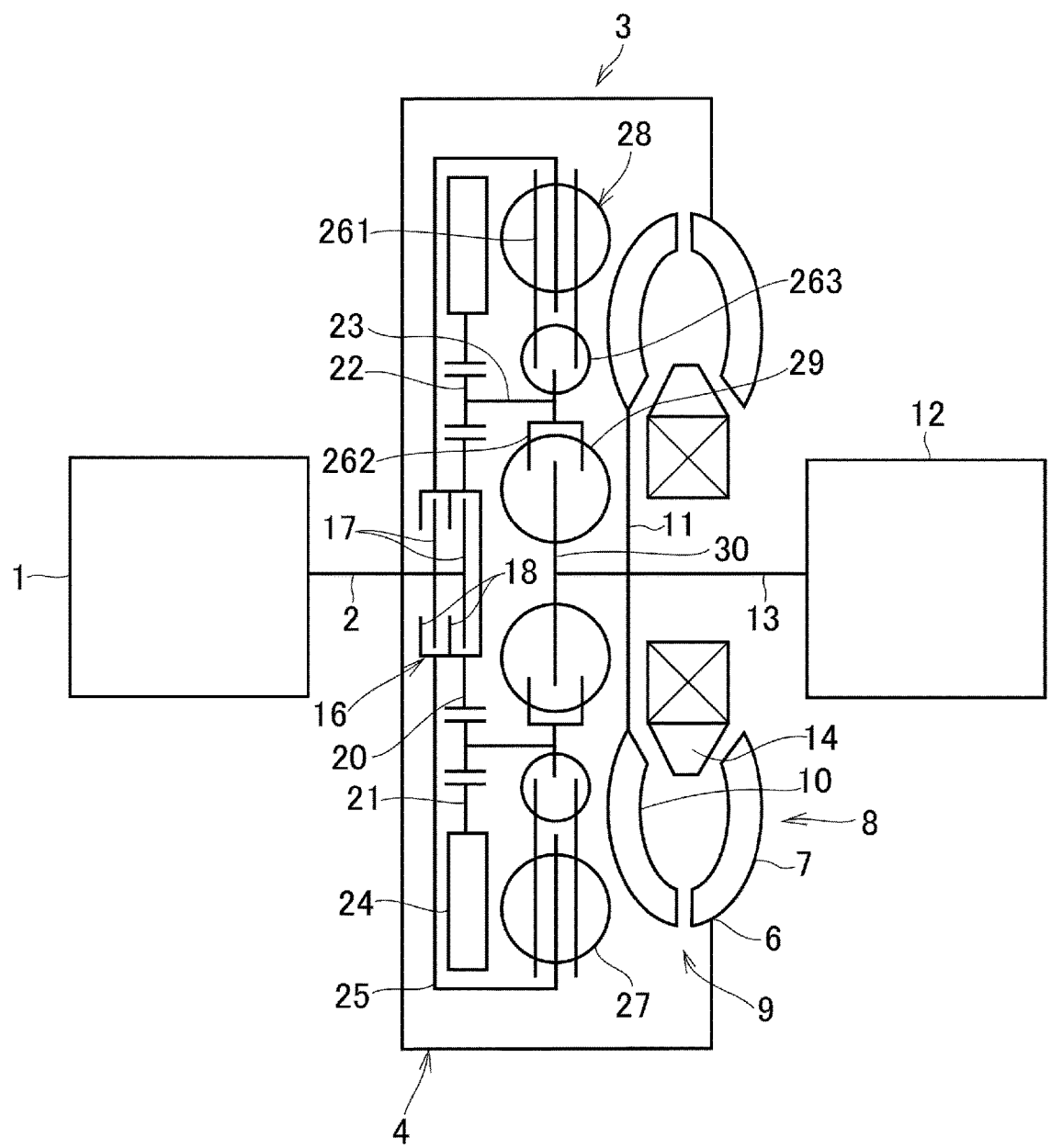
FIG. 12 is a schematic illustration showing a structure of a torque converter having a torsional vibration damping device according to an eighth embodiment of the present disclosure.
Figure 13:
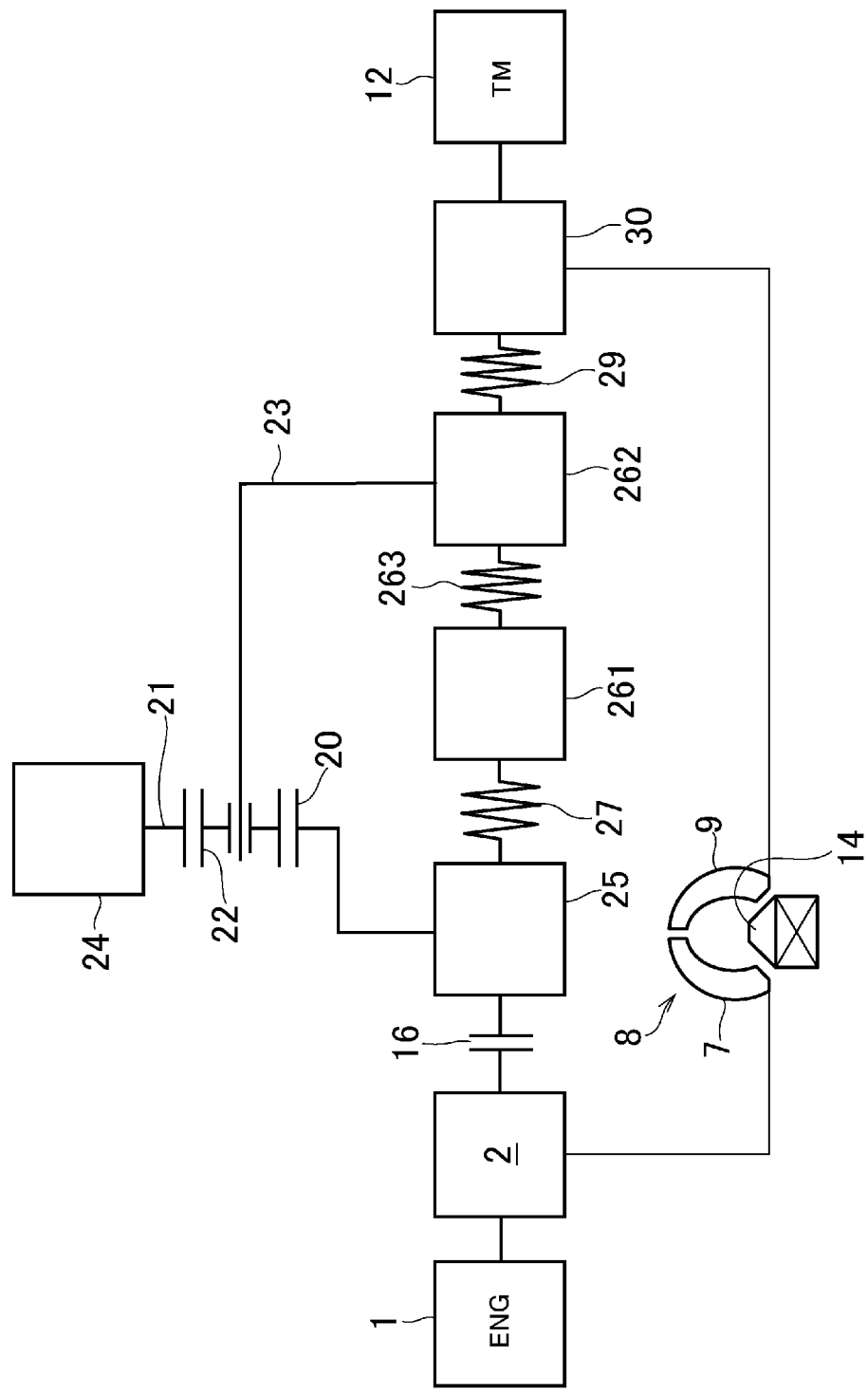
FIG. 13 is a block diagram schematically showing a vibration system according to the eighth embodiment of the present disclosure.

As illustrated in FIGS. 12 and 13, according to the eighth embodiment, the intermediate member 26 may be divided into a plurality of plates, and the plates may be connected to each other through an elastic member. Specifically, the eighth embodiment is a modification of the sixth embodiment, and according to the eighth embodiment, the intermediate member 26 is divided into a first plate 261 and a second plate 262. The first plate 261 and the second plate 262 are connected to each other through a third elastic member 263 while being opposed to each other. The first plate 261 is connected to the connection member 25 through the first elastic members 27 to form the spring damper 28, as in the case of the intermediate member 26 illustrated in FIG. 6. The second plate 262 is connected to the carrier 23 and to the output member 30 through the second elastic members 29. The second plate 262 is arranged in an inner circumferential side of the first plate 261. For example, the third elastic member 263 as a coil spring or the like is arranged between not shown inner and outer circumferential portions of the first plate 261 and the second plate 262 being opposed to each other in the circumferential direction (rotational direction). Thus, the plates 261 and 262 and the third elastic member 263 form a spring damper. The remaining elements of the eighth embodiment are similar to those of the second embodiment shown in FIG. 6, and the common reference numerals are allotted to the elements in common with those of the second embodiment.

FIG. 13 is a block diagram schematically showing a vibration system in the eighth embodiment illustrated in FIG. 12. The first plate 261 is interposed between the connection member 25 connected to the sun gear 20, and the second plate 262 connected to the carrier 23. One face of the first plate 261 is connected to the connection member 25 through the first elastic member 27, and the other face of the first plate 261 is connected to the second plate 262 through the third elastic member 263. In the eighth embodiment, the vibration systems of the torsional vibration damping device and the transmission 12 are also separated from each other to achieve the advantages of the second embodiment.

Ninth Embodiment

Figure 14:
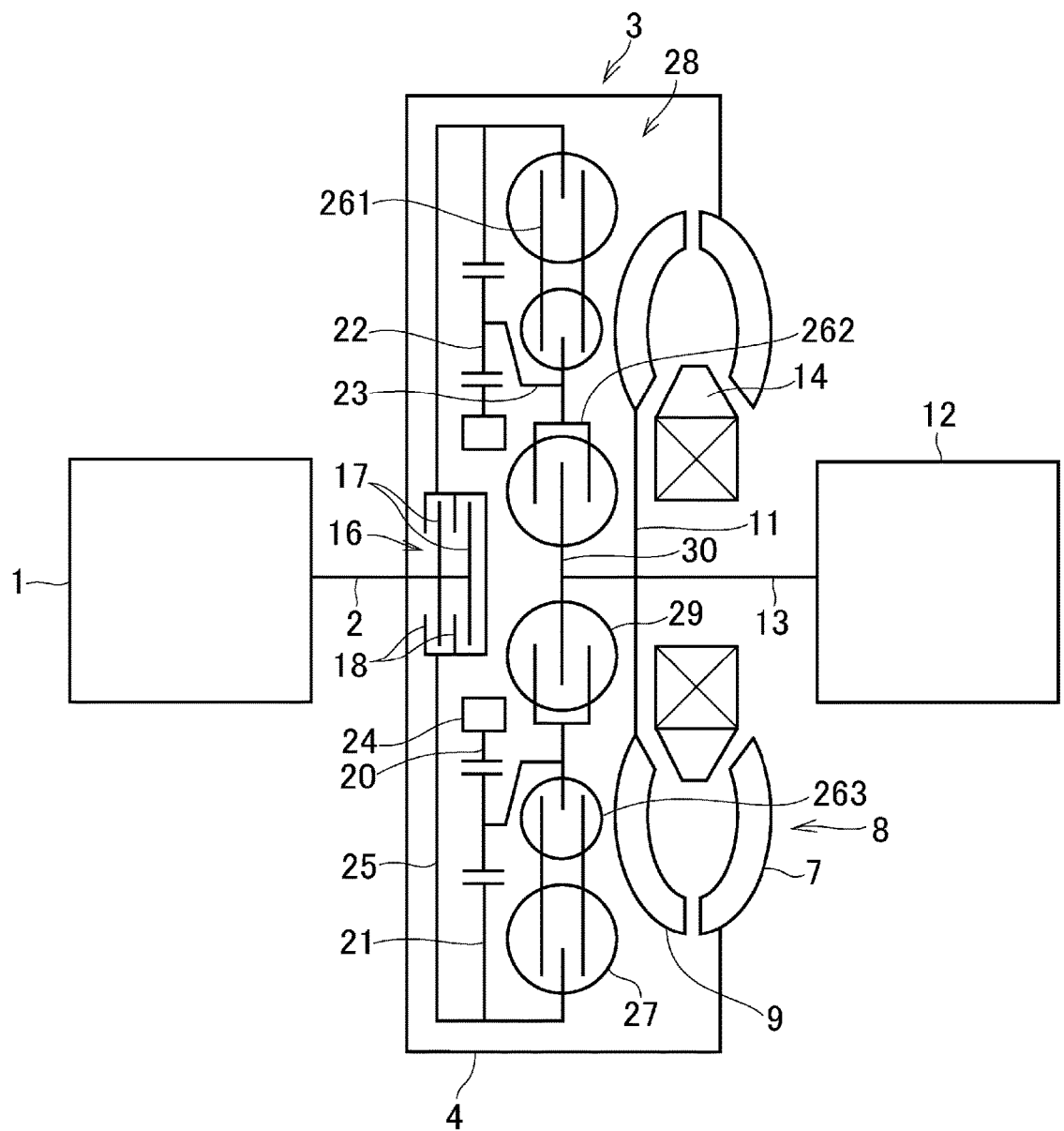
FIG. 14 is a schematic illustration showing a structure of a torque converter having a torsional vibration damping device according to a ninth embodiment of the present disclosure.
Figure 15:
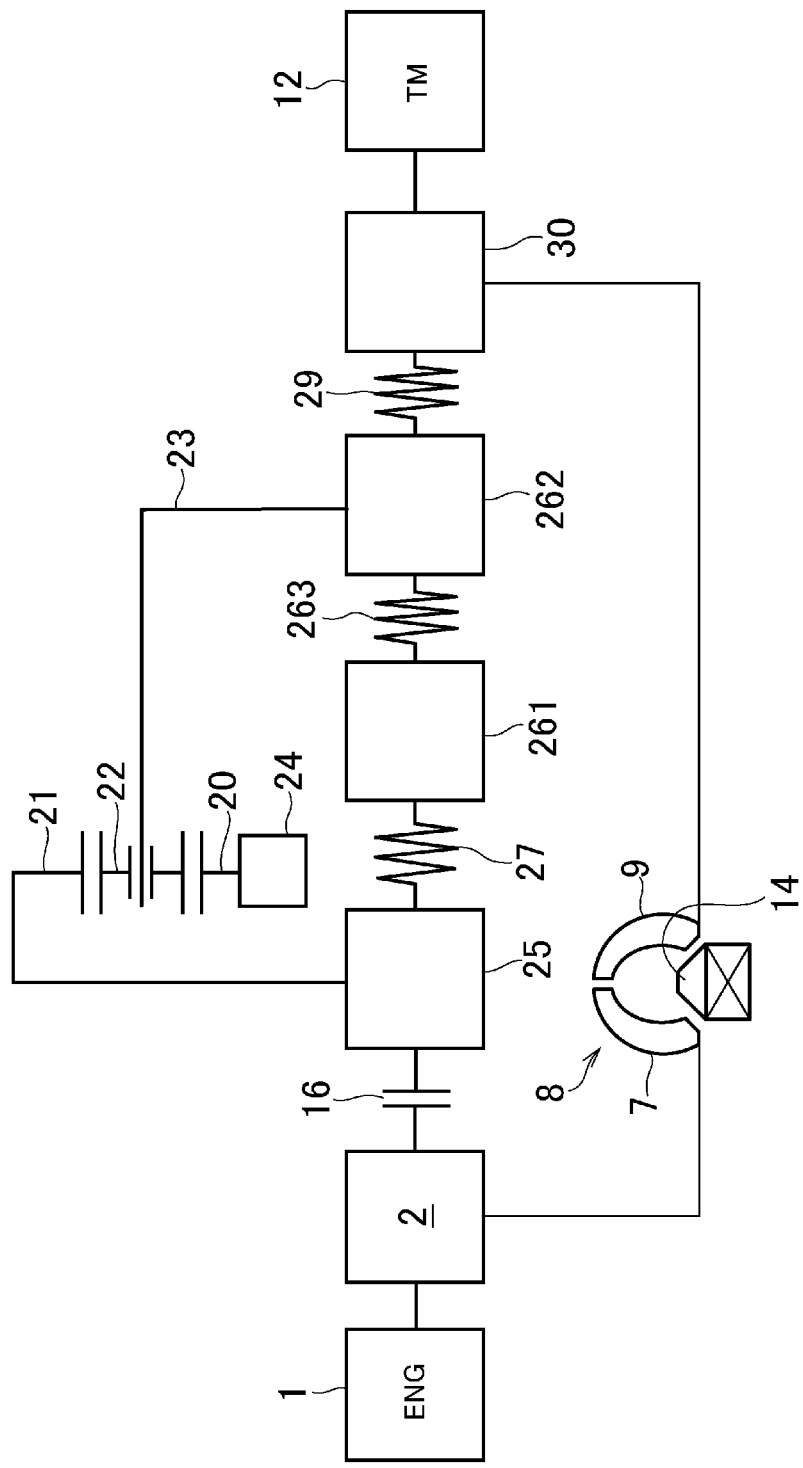
FIG. 15 is a block diagram schematically showing a vibration system according to the ninth embodiment of the present disclosure.

The ninth embodiment is shown in FIGS. 14 and 15. Specifically, the ninth embodiment is a modification of the fourth embodiment shown in FIG. 8, and the intermediate member 26 is divided into the first plate 261 and the second plate 262. The first segment 261 and the second segment 262 are connected to each other through the third elastic member 263 while being opposed to each other. The first segment 261 is connected to the connection member 25 through the first elastic members 27 to form the spring damper 28, as in the case of the intermediate member 26 shown in FIG. 8. The second plate 262 is connected to the carrier 23 and to the output member 30 through the second elastic members 29. The second plate 262 is arranged in an inner circumferential side of the first plate 261. For example, the third elastic member 263 as a coil spring or the like is arranged between not shown inner and outer circumferential portions of the first plate 261 and the second plate 262 being opposed to each other in the circumferential direction (rotational direction). Thus, the plates 261 and 262 and the third elastic member 263 also form a spring damper. The remaining elements of the ninth embodiment are similar to those of the fourth embodiment shown in FIG. 8, and the common reference numerals are allotted to the elements in common with those of the fourth embodiment.

FIG. 15 is a block diagram schematically showing a vibration system in the ninth embodiment illustrated in FIG. 14. The first plate 261 is interposed between the connection member 25 connected to the ring gear 21, and the second plate 262 connected to the carrier 23. One face of the first plate 261 is connected to the connection member 25 through the first elastic member 27 and the other face of the first plate 261 is connected to the second plate 262 through the third elastic member 263. In the ninth embodiment, the vibration systems of the torsional vibration damping device and the transmission 12 are also separated from each other to achieve the advantages of the fourth embodiment.

10th Embodiment

Figure 16:
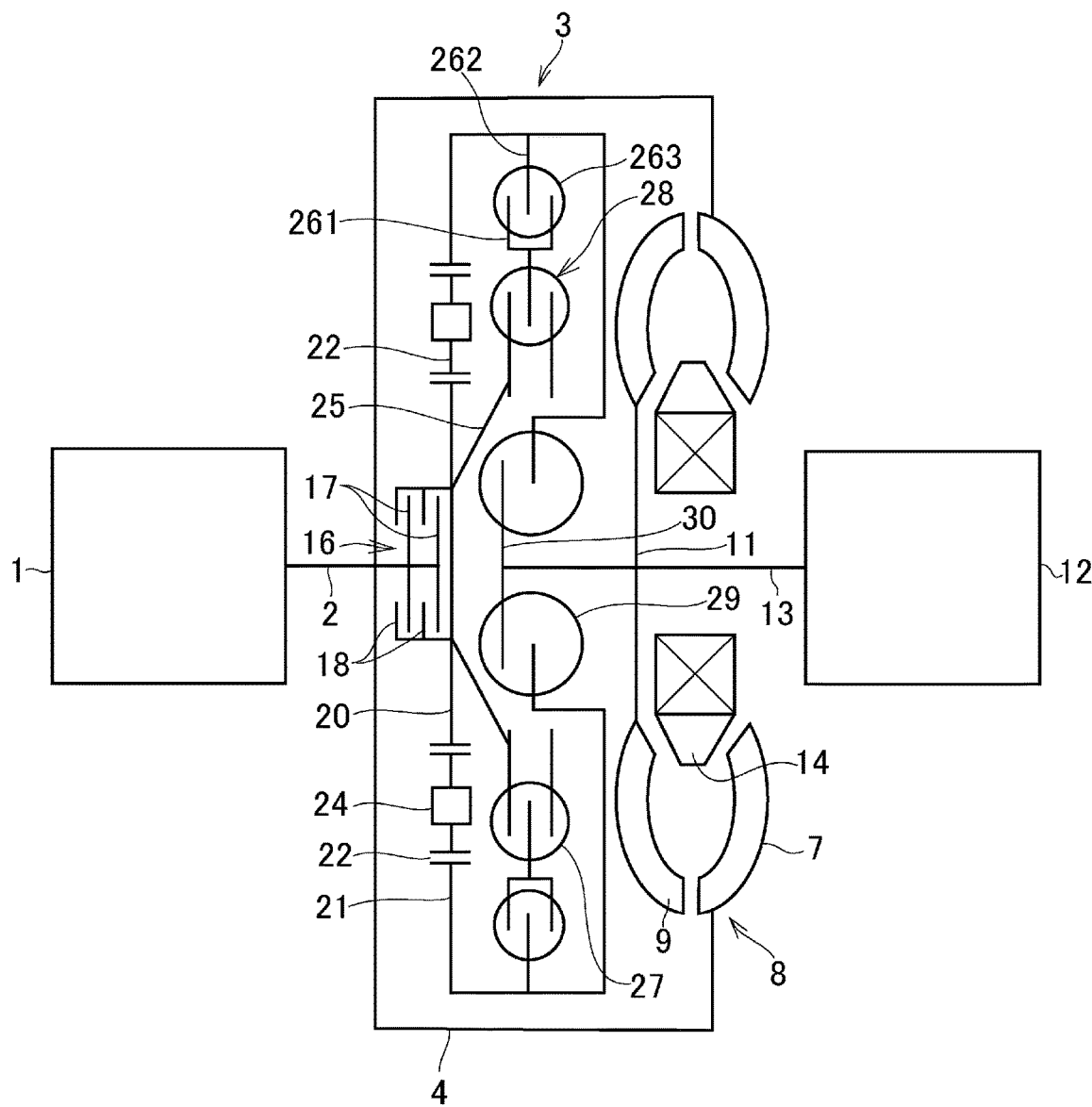
FIG. 16 is a schematic illustration showing a structure of a torque converter having a torsional vibration damping device according to a 10th embodiment of the present disclosure.
Figure 17:
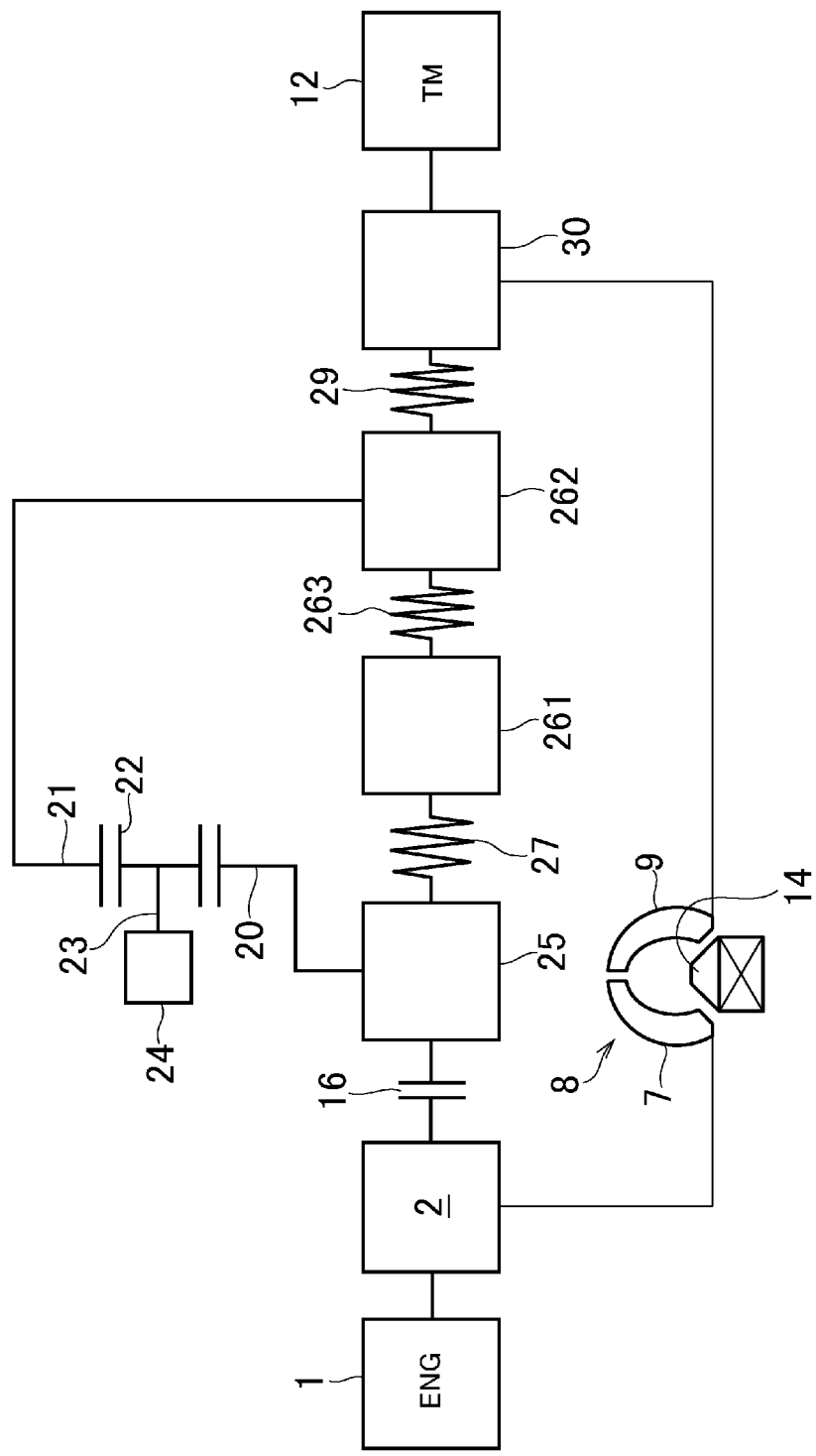
FIG. 17 is a block diagram schematically showing a vibration system according to the 10th embodiment of the present disclosure.

The tenth embodiment is shown in FIGS. 16 and 17. Specifically, the tenth embodiment is a modification of the fifth embodiment shown in FIG. 9, and the intermediate member 26 is divided into the first plate 261 and the second plate 262. The first segment 261 and the second segment 262 are connected to each other through the third elastic member 263 while being opposed to each other. The first segment 261 is connected to the connection member 25 (or the sun gear 20) through the first elastic members 27 to form the spring damper 28, as in the case of the intermediate member 26 shown in FIG. 9. The second plate 262 is connected to the carrier 23 and to the output member 30 through the second elastic members 29. The second plate 262 is arranged in an inner circumferential side of the first plate 261. For example, the third elastic member 263 as a coil spring or the like is arranged between not shown inner and outer circumferential portions of the first plate 261 and the second plate 262 being opposed to each other in the circumferential direction (rotational direction). Thus, the plates 261 and 262 and the third elastic member 263 also form a spring damper. The remaining elements of the tenth embodiment are similar to those of the fifth embodiment shown in FIG. 9, and the common reference numerals are allotted to the elements in common with those of the fifth embodiment.

FIG. 17 is a block diagram schematically showing a vibration system in the tenth embodiment illustrated in FIG. 16. The first plate 261 is interposed between the connection member 25 connected to the sun gear 20, and the second plate 262 connected to the ring gear 21. One face of the first plate 261 is connected to the connection member 25 through the first elastic member 27 and the other face of the first plate 261 is connected to the second plate 262 through the third elastic member 263. In the tenth embodiment, the vibration systems of the torsional vibration damping device and the transmission 12 are also separated from each other to achieve the advantages of the fifth embodiment.

11th Embodiment

Figure 18:
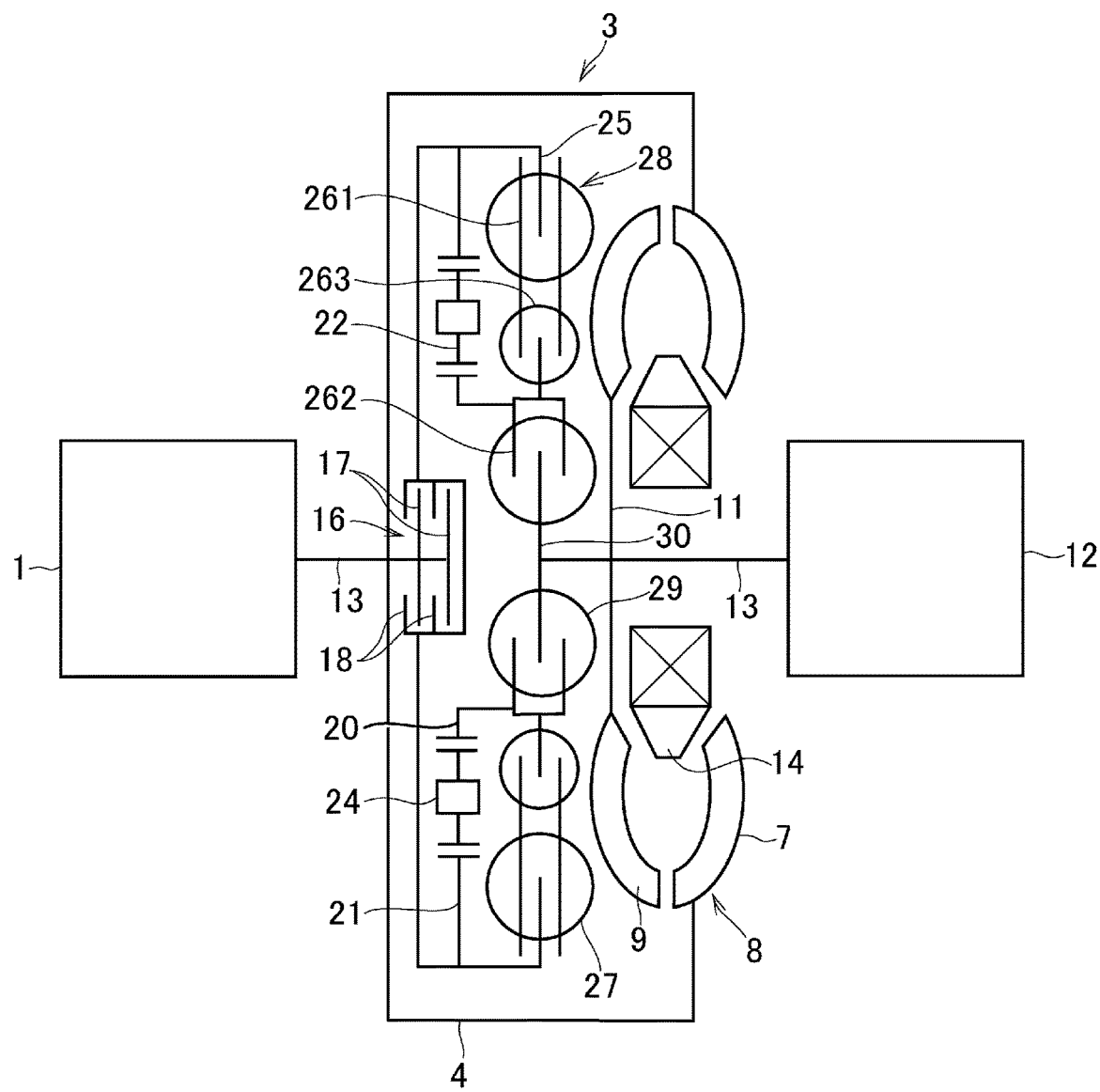
FIG. 18 is a schematic illustration showing a structure of a torque converter having a torsional vibration damping device according to an 11th embodiment of the present disclosure.
Figure 19:
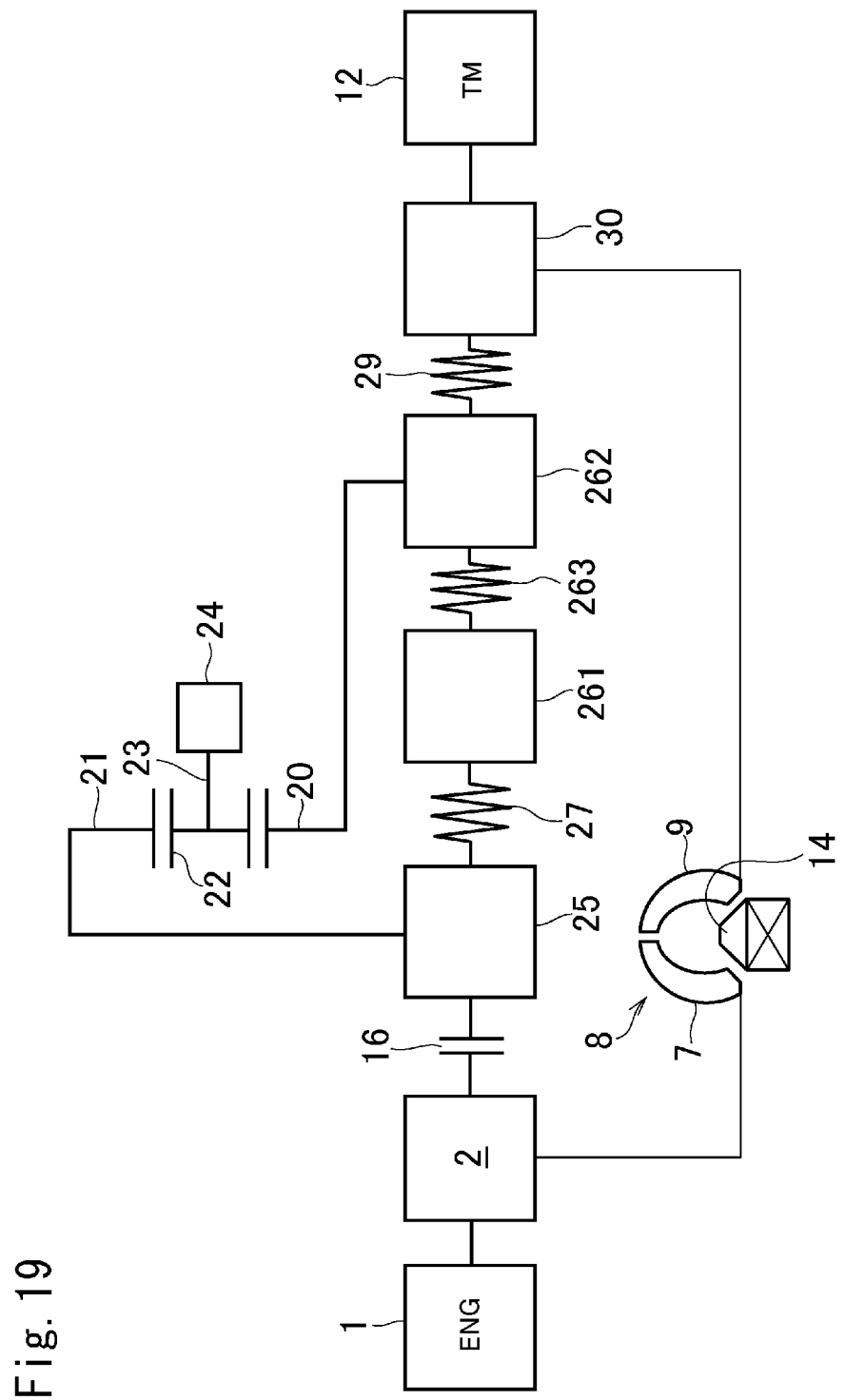
FIG. 19 is a block diagram schematically showing a vibration system according to the 11th embodiment of the present disclosure.

The eleventh embodiment is shown in FIGS. 18 and 19. Specifically, the tenth embodiment is a modification of the sixth embodiment shown in FIG. 10, and the intermediate member 26 is divided into the first plate 261 and the second plate 262. The first segment 261 and the second segment 262 are connected to each other through the third elastic member 263 while being opposed to each other. The first segment 261 is connected to the connection member 25 (or the ring gear 21) through the first elastic members 27 to form the spring damper 28, as in the case of the intermediate member 26 shown in FIG. 10. The second plate 262 is connected to the sun gear 20 and to the output member 30 through the second elastic members 29. The second plate 262 is arranged in an inner circumferential side of the first plate 261. For example, the third elastic member 263 as a coil spring or the like is arranged between not shown inner and outer circumferential portions of the first plate 261 and the second plate 262 being opposed to each other in the circumferential direction (rotational direction). Thus, the plates 261 and 262 and the third elastic member 263 also form a spring damper. The remaining elements of the tenth embodiment are similar to those of the sixth embodiment shown in FIG. 10, and the common reference numerals are allotted to the elements in common with those of the fifth embodiment.

FIG. 19 is a block diagram schematically showing a vibration system in the eleventh embodiment illustrated in FIG. 18. The first plate 261 is interposed between the connection member 25 connected to the ring gear 21, and the second plate 262 connected to the sun gear 20. One face of the first plate 261 is connected to the connection member 25 through the first elastic member 27 and the other face of the first plate 261 is connected to the second plate 262 through the third elastic member 263. In the eleventh embodiment, the vibration systems of the torsional vibration damping device and the transmission 12 are also separated from each other to achieve the advantages of the sixth embodiment.

The present disclosure should not be limited to the embodiments described above. For example, in the torsional vibration damping device according to the present disclosure, a planetary roller unit may also be used instead of the planetary gear unit. In addition, the planetary unit may also be incorporated with a fluid coupling without having a torque amplifying function.

What is claimed is:

1. A torsional vibration damping device that is disposed on a torque transmission route between an engine and a transmission, comprising: a planetary unit that performs a differential action among a first rotary element to which torque of the engine is delivered, a second rotary element, and a third rotary element serving as a rotary inertial mass, and
a lockup clutch that is engaged to an inner face of a housing, the housing being connected to the engine, wherein the planetary unit is arranged concentrically with the lockup clutch while surrounding and being overlapped with the lockup clutch at least partially in a radial direction of the housing,
wherein the torsional vibration damping device is adapted to damp pulsation of the torque of the engine to be delivered to the transmission by an inertial torque generated by a rotation of the third rotary element resulting from a relative rotation between the first rotary element and the second rotary element caused by the pulsation of the torque of the engine,
the torsional vibration damping device comprising:
a connection member that is rotated integrally with the first rotary element;
an intermediate member that is rotated integrally with the second rotary element;
an output member that delivers the torque to the transmission;
a first elastic member that connects the connection member to the intermediate member; and
a second elastic member that connects the intermediate member to the output member,
wherein the planetary unit includes a planetary gear unit having a sun gear, a ring gear arranged concentrically with the sun gear, and a carrier supporting a plurality of pinion gears meshing with the sun gear and the ring gear,
the sun gear serves as the first rotary element,
one of the ring gear and the carrier serves as the second rotary element, and another one of the ring gear and the carrier serves as the third rotary element.

2. The torsional vibration damping device as claimed in claim 1, wherein the first elastic member and the second elastic member are arranged along a circumferential direction of the planetary unit.

3. The torsional vibration damping device as claimed in claim 1, further comprising:
a fluid coupling comprising the housing, a drive member that is connected to the housing and that creates a spiral flow of fluid, a driven member that is driven by the spiral flow of the fluid, and the lockup clutch that is engaged to the inner face of the housing to connect the drive member to the driven member,
wherein the planetary unit is arranged in the fluid coupling,
the first rotary element is selectively connected to the engine through the lockup clutch, and
the transmission is connected to the driven member.

4. The torsional vibration damping device as claimed in claim 3, wherein the lockup clutch is arranged on an inner side of the planetary unit in a radial direction of the housing, and the lockup clutch and the planetary unit are arranged concentrically with each other.

5. The torsional vibration damping device as claimed in claim 1, wherein the first elastic member has lower torsional rigidity than the second elastic member.

6. A torsional vibration damping device that is disposed on a torque transmission route between an engine and a transmission, comprising:
a planetary unit that performs a differential action among a first rotary element to which torque of the engine is delivered, a second rotary element, and a third rotary element serving as a rotary inertial mass, a lockup clutch that is engaged to an inner face of a housing, the housing being connected to the engine, wherein the planetary unit is arranged concentrically with the lockup clutch while surrounding and being overlapped with the lockup clutch at least partially in a radial direction of the housing, wherein the torsional vibration damping device is adapted to damp pulsation of the torque of the engine to be delivered to the transmission by an inertial torque generated by a rotation of the third rotary element resulting from a relative rotation between the first rotary element and the second rotary element caused by the pulsation of the torque of the engine, the torsional vibration damping device comprising:

a connection member that is rotated integrally with the first rotary element;

an intermediate member that is rotated integrally with the second rotary element;

an output member that delivers the torque to the transmission;

a first elastic member that connects the connection member to the intermediate member; and a second elastic member that connects the intermediate member to the output member, wherein the planetary unit includes a planetary gear unit having a sun gear, a ring gear arranged concentrically with the sun gear, and a carrier supporting a plurality of pinion gears meshing with the sun gear and the ring gear, the ring gear serves as the first rotary element, one of the sun gear and the carrier serves as the second rotary element, and another one of the sun gear and the carrier serves as the third rotary element.

7. The torsional vibration damping device as claimed in claim 6, wherein the first elastic member and the second elastic member are arranged along a circumferential direction of the planetary unit.

8. The torsional vibration damping device as claimed in claim 6, further comprising:

a fluid coupling comprising the housing, a drive member that is connected to the housing and that creates a spiral flow of fluid, a driven member that is driven by the spiral flow of the fluid, and the lockup clutch that is engaged to the inner face of the housing to connect the drive member to the driven member, wherein the planetary unit is arranged in the fluid coupling, the first rotary element is selectively connected to the engine through the lockup clutch, and the transmission is connected to the driven member.

9. The torsional vibration damping device as claimed in claim 8, wherein the lockup clutch is arranged on an inner side of the planetary unit in a radial direction of the housing, and the lockup clutch and the planetary unit are arranged concentrically with each other.

10. The torsional vibration damping device as claimed in claim 6, wherein the first elastic member has lower torsional rigidity than the second elastic member.

11. A torsional vibration damping device that is disposed on a torque transmission route between an engine and a transmission, comprising:

a planetary unit that performs a differential action among a first rotary element to which torque of the engine is delivered, a second rotary element, and a third rotary element serving as a rotary inertial mass, wherein the torsional vibration damping device is adapted to damp pulsation of the torque of the engine to be delivered to the transmission by an inertial torque generated by a rotation of the third rotary element resulting from a relative rotation between the first rotary element and the second rotary element caused by the pulsation of the torque of the engine, a connection member that is rotated integrally with the first rotary element;

an intermediate member that is rotated integrally with the second rotary element;

an output member that delivers the torque to the transmission;

a first elastic member that connects the connection member to the intermediate member;

a second elastic member that connects the intermediate member to the output member; and a fluid coupling comprising a housing connected to the engine, a drive member that is connected to the housing and that creates a spiral flow of fluid, a driven member that is driven by the spiral flow of the fluid, and a lockup clutch that is engaged to an inner face of the housing to connect the drive member to the driven member, wherein the planetary unit is arranged in the fluid coupling, the first rotary element is selectively connected to the engine through the lockup clutch, the transmission is connected to the driven member, the planetary unit is arranged concentrically with the lockup clutch while surrounding and being overlapped with the lockup clutch at least partially in a radial direction of the housing, and the lockup clutch is arranged on an inner side of the planetary unit in a radial direction of the housing, and the lockup clutch and the planetary unit are arranged concentrically with each other.

12. The torsional vibration damping device as claimed in claim 11, wherein the first elastic member and the second elastic member are arranged along a circumferential direction of the planetary unit.

13. The torsional vibration damping device as claimed in claim 11, wherein the planetary unit includes a planetary gear unit having a sun gear, a ring gear arranged concentrically with the sun gear, and a carrier supporting a plurality of pinion gears meshing with the sun gear and the ring gear, the carrier serves as the first rotary element, one of the ring gear and the sun gear serves as the second rotary element, and another one of the ring gear and the sun gear serves as the third rotary element.

14. The torsional vibration damping device as claimed in claim 11, wherein the lockup clutch includes a multi-plate clutch having a clutch disc and a clutch plate that is brought into frictional contact to the clutch disc.

15. The torsional vibration damping device as claimed in claim 11, wherein the first elastic member has lower torsional rigidity than the second elastic member.

* * * * *